United States Patent
Aasgaard

[19]

[11] Patent Number: 5,915,901
[45] Date of Patent: Jun. 29, 1999

[54] BLIND SETTING RIVET ASSEMBLY

[75] Inventor: A. L. Pepper Aasgaard, Omaha, Nebr.

[73] Assignee: Asar Group, Inc., Omaha, Nebr.

[21] Appl. No.: 08/958,543

[22] Filed: Oct. 27, 1997

Related U.S. Application Data

[63] Continuation-in-part of application No. 08/678,797, Jul. 12, 1996, Pat. No. 5,762,456, which is a continuation-in-part of application No. 08/679,540, Jul. 12, 1996, Pat. No. 5,741,099.

[51] Int. Cl.⁶ .............................. F16B 13/04; F16B 39/00
[52] U.S. Cl. .............................. 411/29; 411/43; 411/107; 411/542
[58] Field of Search .......................... 411/107, 29, 34–38, 411/43, 501, 542

[56] References Cited

U.S. PATENT DOCUMENTS

| | | |
|---|---|---|
| 1,121,076 | 12/1914 | Dillon . |
| 1,330,689 | 2/1920 | Drew . |
| 3,451,303 | 6/1969 | Biermann . |
| 3,750,518 | 8/1973 | Rayburn . |
| 3,935,786 | 2/1976 | Murray et al. . |
| 4,085,337 | 4/1978 | Moeller . |
| 4,211,145 | 7/1980 | Dolch ........................................ 411/43 |
| 4,218,953 | 8/1980 | Haytayan . |
| 4,246,828 | 1/1981 | Tamashiro . |
| 4,377,361 | 3/1983 | Frieberg . |
| 4,388,031 | 6/1983 | Rodgers . |
| 4,408,938 | 10/1983 | Maguire . |
| 4,436,467 | 3/1984 | Larsson et al. . |
| 4,580,936 | 4/1986 | Francis et al. . |
| 4,920,833 | 5/1990 | Rosenthal . |
| 4,988,247 | 1/1991 | Summerlin . |
| 4,990,042 | 2/1991 | Szayer et al. . |
| 4,998,853 | 3/1991 | Shiajo . |
| 5,178,501 | 1/1993 | Carstairs . |
| 5,183,357 | 2/1993 | Palm . |
| 5,213,459 | 5/1993 | Palm . |
| 5,219,252 | 6/1993 | Schruff . |
| 5,230,137 | 7/1993 | Abe . |
| 5,246,323 | 9/1993 | Vernet et al. . |
| 5,252,014 | 10/1993 | Andrews . |
| 5,297,909 | 3/1994 | Tsay et al. . |
| 5,332,346 | 7/1994 | Shinjo . |
| 5,344,267 | 9/1994 | Stenberg et al. . |
| 5,383,753 | 1/1995 | Palm . |
| 5,472,303 | 12/1995 | Palm et al. . |

FOREIGN PATENT DOCUMENTS

| | | |
|---|---|---|
| 77858 | 5/1983 | European Pat. Off. . |
| 705797 | 5/1966 | Italy . |
| 25535 | 12/1898 | United Kingdom . |
| 2147385 | 5/1985 | United Kingdom . |

*Primary Examiner*—Neill Wilson
*Attorney, Agent, or Firm*—Suiter & Associates PC

[57] ABSTRACT

A blind setting rivet assembly capable of permanently fastening one or more sheet metal work pieces or the like together is disclosed. The rivet assembly may be self tapping and may also provide a hollow cylindrical threaded bolt head onto which a nut may be affixed to provide a means to removably attach other work pieces, components or the like. The rivet assembly comprises a rivet body having a hollow tubular sleeve and an enlarged flattened head. The rivet body surrounds a mandrel which may have a weakened area of reduced diameter to allow detachment of the mandrel shaft following application of sufficient axial force to the shank. This application of force sets the rivet by causing a tapered shoulder section of the mandrel to deform the rivet sleeve. The mandrel shank may be terminated in a screw tip. This screw tip punctures, spreads, and self-taps an aperture in the work pieces through which the rivet sleeve passes. The mandrel's shank may have a weakened area of reduced diameter adjacent to the screw tip which allows detachment of shaft following application of sufficient axial force to the shank. This application of force causes the tapered shoulder section of the screw tip to compress and deform the rivet sleeve which sets the rivet.

18 Claims, 17 Drawing Sheets

BLIND SETTING RIVET ASSEMBLY

The present application is a continuation-in-part of U.S. Ser. No. 08/678,797 filed Jul. 12, 1996 now U.S. Pat. No. 5,762,456. The present application is also a continuation-in-part of U.S. Ser. No. 08/679,540 filed Jul. 12, 1996 now U.S. Pat. No. 5,741,099.

BACKGROUND OF THE INVENTION

Blind setting rivets are used to fasten sheet metal work pieces or the like together while requiring access to only one side. These rivets have been in use for many years and are well known to the art. However, application of these rivets may at times be cumbersome. For example, in many applications, special jigs must be used to maintain exact alignment of the work pieces from the time the hole is drilled until the rivet can be applied.

Because of these and other limitations, self drilling blind setting rivets were developed. Rayburn (U.S. Pat. No. 3,750,518), Murray et al. (U.S. Pat. No. 3,935,786), Rosenthal (U.S. Pat. No. 4,920,833), Shinjo (U.S. Pat. No. 4,998,853) and Stenberg et al. (U.S. Pat. No. 5,344,267) disclose self-drilling blind setting rivet type fasteners. These rivets all utilize specialized drill heads which may be difficult to manufacture and thus expensive. Further, they may leave a burr on the outer layer of the work piece materials. This burr may prevent proper seating of the rivet as it is applied. Improper seating may cause a weak joint. Szayer et al. (U.S. Pat. No. 4,990,042) discloses a self-drilling rivet having deburring ears to remove burrs during the drilling operation. However, the Szayer drill bit removes work piece material to create a hole for the rivet shank. This removed material may fall within an enclosed area causing a possible nuisance or hazard. Further, this material could be more efficiently used to increase application strength. A more desirable blind setting rivet would be self-tapping (using a screw tip) instead of self drilling (using a drill bit). This self-tapping rivet would leave uniform excurvations which would increase application strength. Additionally, a self-tapping rivet would be less expensive and easier to manufacture.

The prior art has also failed to teach a blind setting rivet which may permanently fasten sheet metal work pieces or the like together and also removably attach other work pieces or components. For example, the above named patents are representative of typical blind setting rivets. These rivets do not contemplate a means of removably attaching other work pieces or components. Tsay et al. (U.S. Pat. No. 5,297,909) discloses a self-drilling expansion screw having a threaded portion onto which a nut may be screwed. However, the Tsay patent describes an expansion screw not a rivet. This expansion screw is designed to be anchored in concrete or the like and is incapable of permanently fastening one or more sheet metal work pieces together.

Consequently, it would be advantageous to provide a blind setting rivet, which may be self-tapping, capable of permanently fastening one or more sheet metal work pieces or the like together while also providing a means to removably attach other work pieces, components or the like.

OBJECTS OF THE INVENTION

Therefore, an object of the present invention is to provide a superior blind setting rivet which is self-tapping, leaving uniform excurvations which increase application strength and allow the rivet to seat properly.

Another object of the present invention is to provide a blind setting rivet which may be used to fasten one or more sheet metal or other work piece materials together while requiring access to only one side which also provides a means to removably attach other work pieces, components, or the like.

Yet another object of the present invention is to provide a self-tapping, blind setting rivet which may be used to join one or more sheet metal work pieces together while requiring access to only one side which also provides a means to removably attach other work pieces, components, or the like.

Still another object of the present invention is to provide a process for applying a blind setting bolt rivet assembly utilizing a simple adaptor which is inexpensive and easy to manufacture.

A further object of the present invention to provide a blind setting rivet which is inexpensive and easy to manufacture.

SUMMARY OF THE INVENTION

The present invention provides a blind setting rivet assembly capable of permanently fastening one or more sheet metal work pieces or the like together. The rivet assembly may be self tapping and may also provide a hollow cylindrical threaded bolt head onto which a nut may be affixed to provide a means to removably attach other work pieces, components or the like. The rivet assembly comprises a rivet body having a hollow tubular sleeve and an enlarged flattened head. The rivet body surrounds a mandrel which may have a weakened area of reduced diameter to allow detachment of the mandrel shaft following application of sufficient axial force to the shank. This application of force sets the rivet by causing a tapered shoulder section of the mandrel to deform the rivet sleeve. The mandrel shank may be terminated in a screw tip. This screw tip punctures, spreads, and self-taps an aperture in the work pieces through which the rivet sleeve passes. The mandrel's shank may have a weakened area of reduced diameter adjacent to the screw tip which allows detachment of shaft following application of sufficient axial force to the shank. This application of force causes the tapered shoulder section of the screw tip to compress and deform the rivet sleeve which sets the rivet.

After application of the rivet, the screw tip may either be retained permanently within the rivet sleeve or allowed to drop off. In an embodiment wherein the screw tip is retained, the shoulder section of the mandrel preferably has a tapered upper face. Additionally, the shank may have an area of enlarged diameter spaced between the shoulder section and the area of reduced diameter. The shoulder section and area of enlarged diameter act together to retain the screw tip and shoulder section within the sleeve by creating an interference with the inner diameter of the lower end of the sleeve. This interference is created by deformation of the sleeve during application of the rivet.

In an embodiment wherein the screw tip is allowed to drop off, the shoulder section of the mandrel may have an upper face consisting of a tapered inner section and a flat-plate outer section. In this embodiment, the tapered inner section initially spreads the lower end of the sleeve. The flatplate outer section then flattens the lower end of the sleeve against the work piece allowing the screw tip and shoulder section to drop off following application.

The rivet assembly may further comprise a locking washer to prevent rotation of the rivet body when the nut is tightened on the threaded bolt head. This washer may encircle the rivet body sleeve and be trapped between the enlarged flattened head and the upper surface of a work piece. Alternatively, the rivet assembly may comprise an enlarged flattened head having a serrated forward surface to prevent rotation upon application to the work pieces and addition of a nut.

BRIEF DESCRIPTION OF THE DRAWINGS

The numerous objects and advantages of the present invention may be better understood by those skilled in the art by reference to the accompanying of which.

DETAILED DESCRIPTION OF EXEMPLARY EMBODIMENTS

Reference will now be made in detail to the presently preferred embodiments of the invention, examples of which are illustrated in the accompanying drawings.

Discussion of FIGS. 1 through 12

Figure 1:
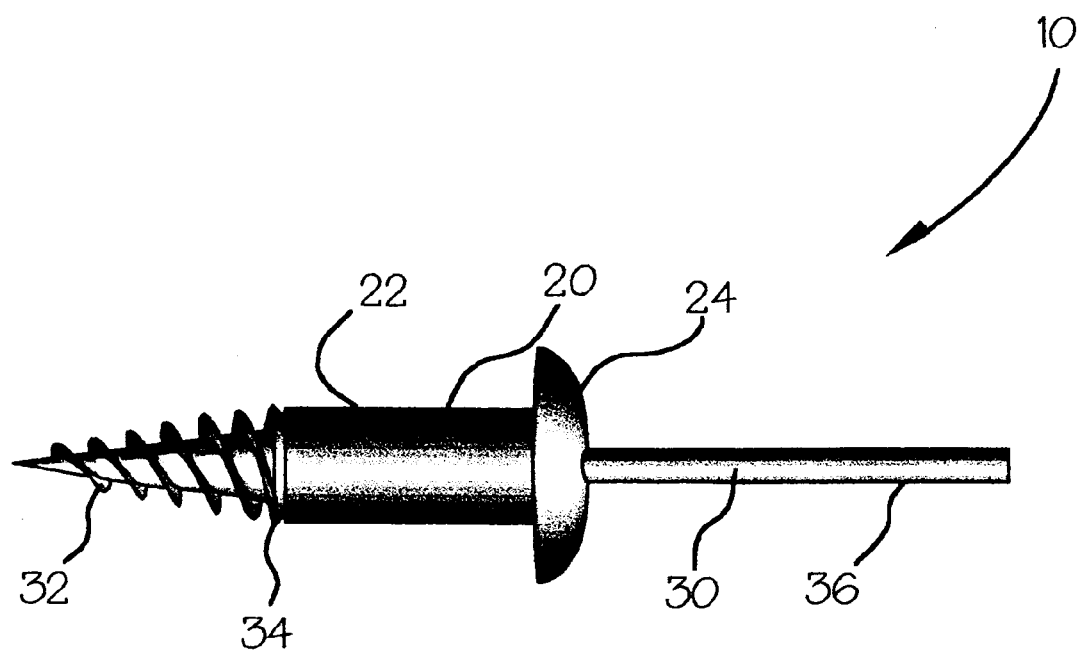
FIG. 1 is a side elevational view of an embodiment of the present invention disclosing a self-tapping, blind setting rivet assembly.

FIG. 1 discloses a self-tapping, blind setting rivet assembly 10 according to an exemplary embodiment of the present invention. The rivet assembly 10 comprises two basic elements, a rivet body 20 having a hollow tubular sleeve 22 and an enlarged flattened head 24 surrounding a mandrel 30 having a self-tapping screw tip 32, shoulder section 34, and shank 36. The rivet body 20 may be made of steel, aluminum, plastic, composite, or other desirable rivet material. The mandrel 30 may be made of steel, aluminum, plastic, composite, or other material which is preferably of higher tensile strength than the rivet body material.

Figure 2:
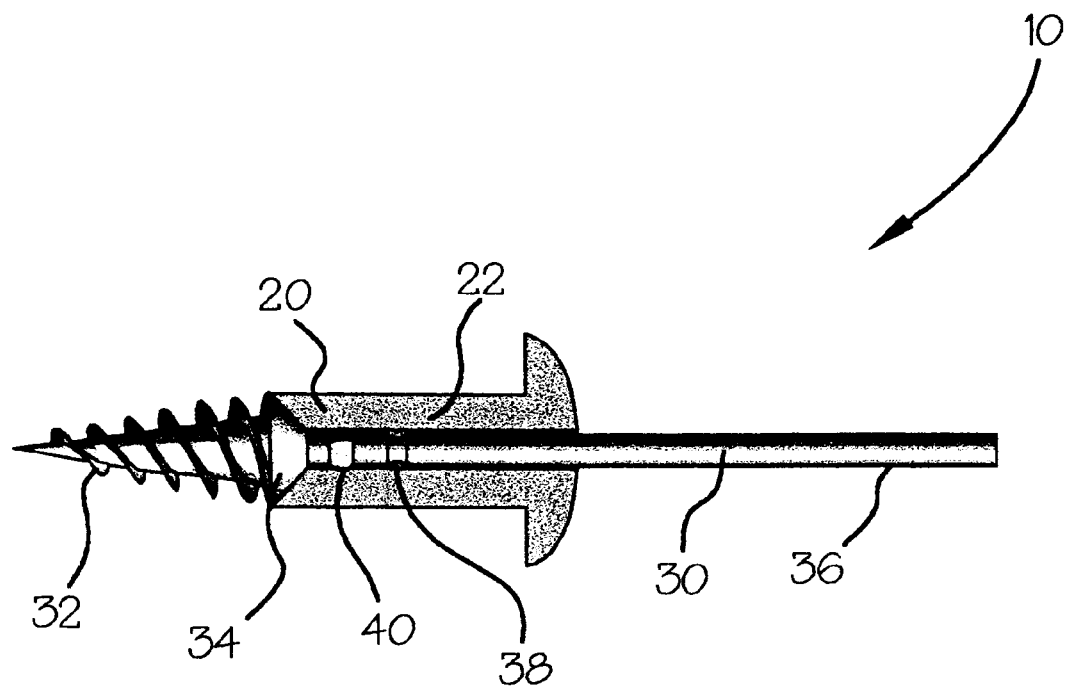
FIG. 2 is a partial cross-sectional side elevational view of the rivet assembly shown in FIG. 1 illustrating the rivet body and mandrel.

FIG. 2 provides a cross-sectional view of the rivet body 20 and discloses additional features of the mandrel 30. A weakened area of reduced diameter 38 may be formed on the mandrel shank 36 rearward from the shoulder section 34. This weakened area 38 is preferably sized to allow the screw tip 32 and shoulder section 34 to be detached from the shank 36 upon application of predetermined tensile force to the shank. Likewise, an area of enlarged diameter 40 may be formed on the shank 36 between the shoulder section 34 and the weakened area of reduced diameter 38. Preferably, this enlarged area 40 retains the screw tip 32 and shoulder section 34 within the sleeve 22 after application of the rivet by creating an interference with the inner surface of the sleeve. This interference may be created as the sleeve 22 is deformed during application of the rivet.

Figure 3:
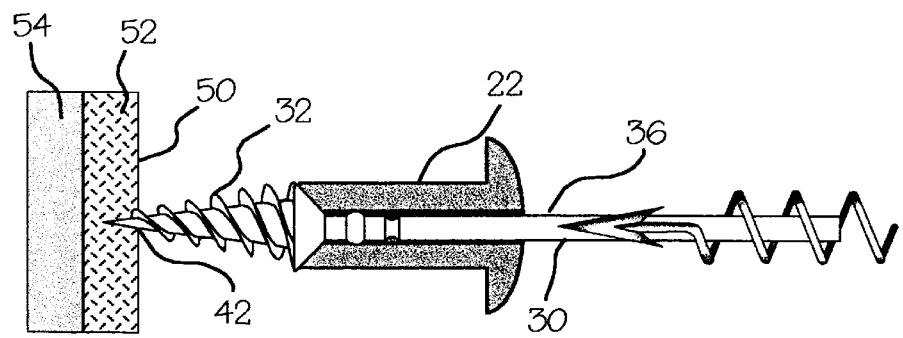
FIG. 3 is a partial cross-sectional side elevational view of the rivet assembly shown in FIG. 1 depicting the rivet assembly at the beginning of application.

FIGS. 3 through 6 illustrate the application of the self-tapping, blind setting rivet assembly 10, described in connection with FIG. 1, to fasten two or more work pieces (52 & 54) together. FIG. 3 is a partial cross-sectional side elevational view depicting the rivet assembly 10 at the beginning of application. The self-tapping screw tip 32 forms a hole or aperture by puncturing and separating the work piece materials 52 & 54. The screw tip 32 may be held normal to the outer work piece surface 50 while rotary motion is applied to the mandrel shank 36. This rotary motion threads the screw tip 32 into the workpiece materials 52 & 54 and expands them. In this manner, the screw tip 32 pulls itself through the work piece materials. Preferably, the screw tip 32 is essentially a standard sheet metal screw except that it may have a more pointed tip 42 to facilitate piercing of the outer work piece surface 50. The rear portion of the shank 36 may be designed for use with a specialized chuck (not shown) or various types of power or hand tools (not shown) to provide rotary motion and axial retraction to the mandrel 30.

Figure 4:
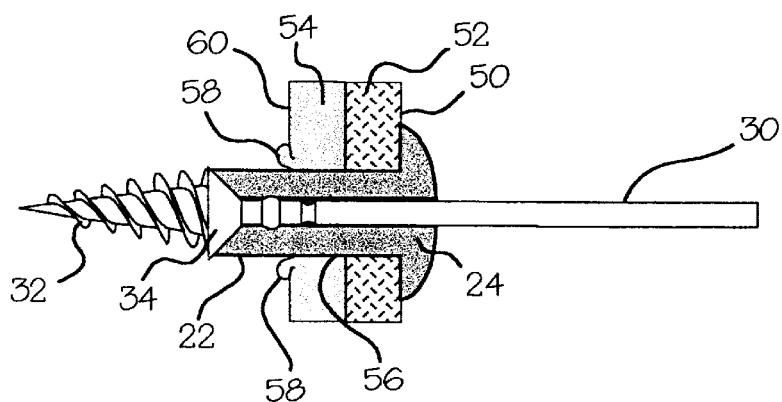
FIG. 4 is a partial cross-sectional side elevational view of the rivet assembly shown in FIG. 1 depicting the rivet assembly following the separation and folding of an aperture through the work piece materials by the screw tip.

FIG. 4 is a partial cross-sectional side elevational view of the rivet assembly 10 illustrated in FIG. 1 following the separation and folding of an aperture 56 through the work piece materials (62 & 64) by the screw tip 32. By using a power or hand tool (not shown), rotary motion may be applied to the mandrel 30 causing the self-tapping screw tip 32 to tap a hole or aperture 56 in adjacent work pieces 52 & 54. As the self-tapping screw tip 32 punctures and spreads the work piece materials, material 38 on the inner surface 60 of the innermost work piece 54 is separated and folded longitudinally. This folding increases the strength of the attachment compared to a drilled hole. Preferably, the outer diameter of the shoulder section 34 of the mandrel 30 is slightly larger than outer diameter of rivet sleeve 22 allowing the sleeve to pass through the hole or aperture formed. The enlarged flattened head 24 of the rivet body may abut on the outer surface 50 of the outer work piece 52 and may be retained there during application of the rivet by a riveting tool (not shown) or the like. The rivet head 24 may have a concave inner surface and a convex outer surface (see FIGS. 10 and 11).

Figure 5:
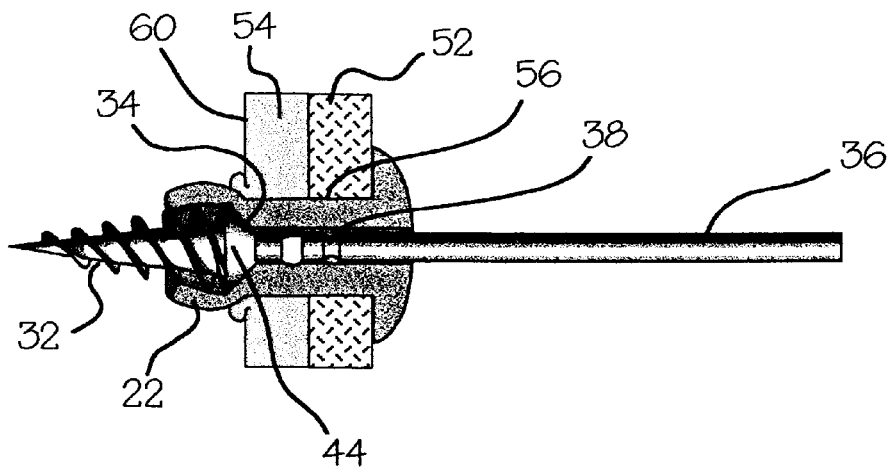
FIG. 5 is a partial cross-sectional side elevational view of the rivet assembly shown in FIG. 1 depicting the rivet assembly after the application of a rearward force on the mandrel shank.

FIG. 5 is a partial cross-sectional side elevational view of the rivet assembly 10 shown in FIG. 1 depicting the rivet assembly following the application of a rearward tension force on the mandrel shank 36. The rear portion of the shank 36 may be grasped by a riveting tool or the like (not shown), and axially retracted. This axial retraction of the mandrel shank 36 causes the mandrel's shoulder section 34 to deform the rivet sleeve 22. As the shoulder section 34 and screw tip 32 are drawn into the rivet sleeve 22, the tapered upper face 44 of the shoulder section spreads the sleeve radially. In this fashion, the rivet sleeve 22 may be spread until it will no longer pass through the aperture 56 created in the work pieces 52 & 54. The rivet sleeve 22 is pulled against the inner surface 60 of the innermost work piece 54. A weakened area of reduced diameter 38 may be sized to break at a predetermined tensile load. This load is preferably greater than the tensile load required to cause deformation of the rivet sleeve 22. FIG. 5 illustrates this deformation, which when coupled with the folding of the work piece material 54, forms a very strong attachment.

Figure 6:
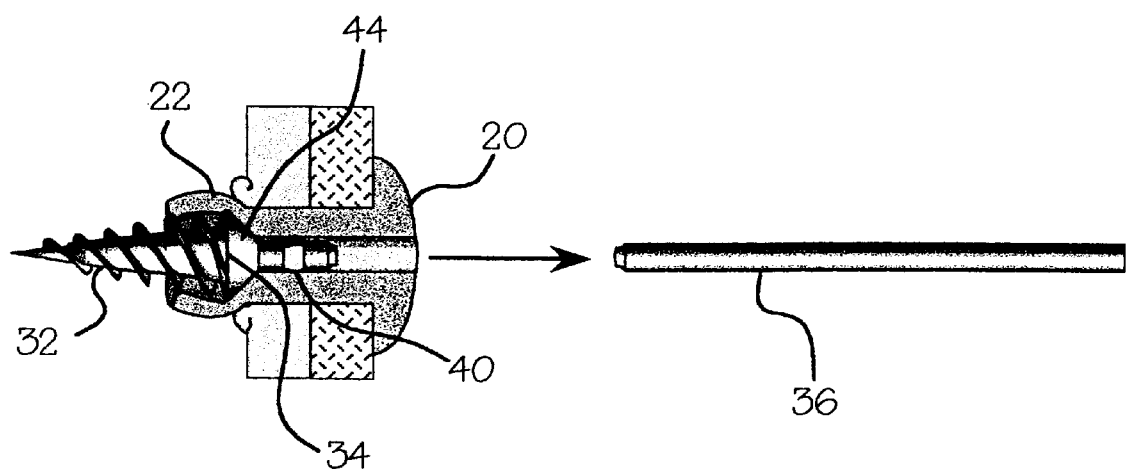
FIG. 6 is a partial cross-sectional side elevational view of the rivet assembly shown in FIG. 1 illustrating separation of the upper shank from the screw tip and shoulder section.

FIG. 6 is a partial cross-sectional side elevational view of the rivet assembly 10 shown in FIG. 1 depicting separation of the upper shank 36 from the screw tip 32 and shoulder section 34. In the present embodiment, the screw tip 32 and shoulder section 34 may be retained in the rivet sleeve 22 of the rivet body 20 due to an interference between the enlarged area 40 of the shank 36 and rivet sleeve. This interference may be created by deformation of the rivet sleeve 22 during application. Likewise, the tapered upper face 44 of the shoulder section 34 may deform the rivet sleeve 22 so as to encircle the screw tip 32 to provide additional retention of the screw tip after application of the rivet.

Figure 7:
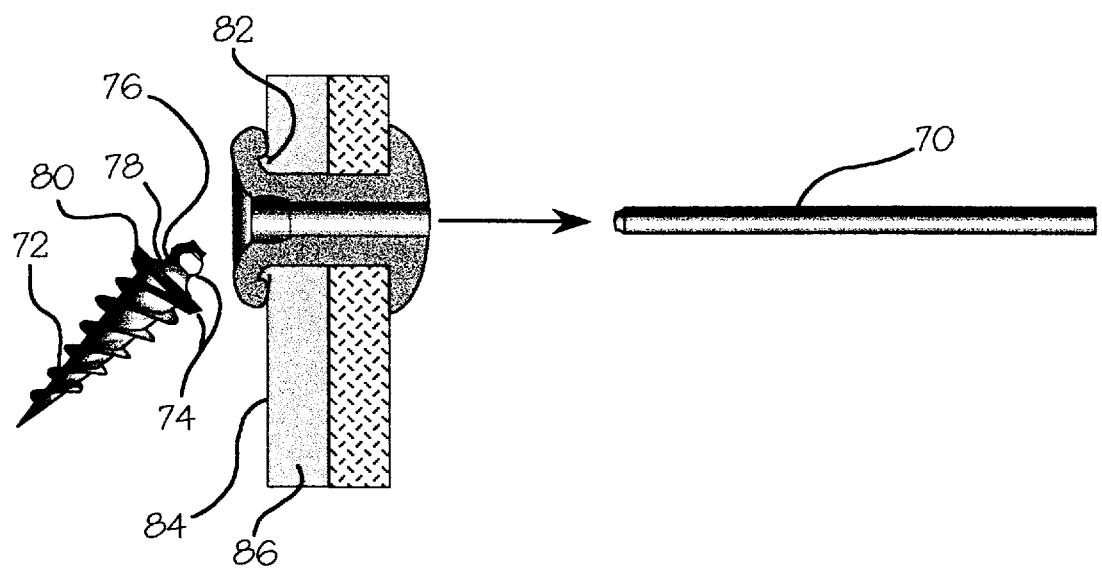
FIG. 7 is a partial cross-sectional side elevational view of an alternative embodiment of the present invention depicting the detachment of the screw tip and shoulder section following application.

FIG. 7 is a partial cross-sectional side elevational view of an to alternative embodiment of the present invention depicting the detachment of the screw tip 72 and shoulder section 74 following application of the rivet. In this embodiment, wherein the screw tip 72 is allowed to drop off, the shoulder section 74 of the mandrel 70 may have an upper face 76 consisting of a tapered inner section 78 and a flat-plate outer section 80. Preferably, the tapered inner section 78 initially spreads the lower end of the rivet sleeve 82. The flat-plate outer section 80 then flattens the sleeve 82 against the inner surface 84 of the innermost work piece 86 allowing the screw tip 72 and shoulder section 74 to drop off following application of the rivet.

Figure 8:
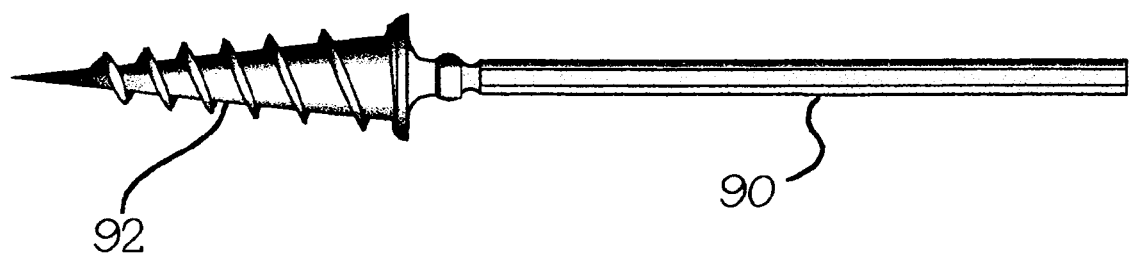
FIG. 8 is a side elevational view of an alternative embodiment of the mandel having a modified six-sided shank and a modified screw tip.
Figure 9:
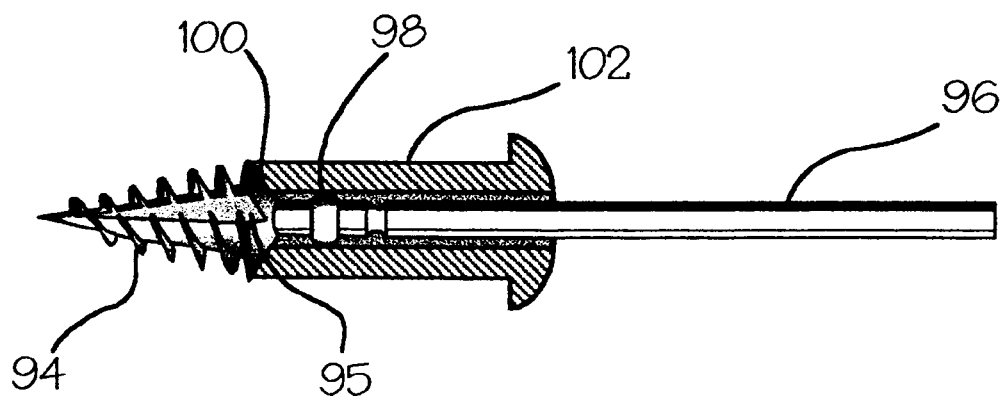
FIG. 9 is a partial cross-sectional side elevational view of yet another embodiment the present invention having a modified six-sided mandrel shank with a modified screw tip.

FIGS. 8 and 9 depict alternative embodiments of the mandrel having modified six-sided shanks 90 & 96. These shanks 90 & 95 may be desirable for heavy duty applications. The shank 90 illustrated in FIG. 8 may be formed without an enlarged area to allow the screw tip 92 to drop off after application. Alternatively, the shank 96 illustrated by FIG. 9 may have an enlarged area 98 and shoulder section 100 (as described in connection with FIG. 6) to allow the shoulder section and screw tip to be retained within the rivet sleeve 102 after application. While a six-sided shank is illustrated, the shank may have a greater or lesser number of sides depending on the application.

Screw tips having different points and thread pitches may be used depending on the materials being joined. For example, FIG. 9 depicts a mandrel having a modified screw tip 92 suitable for joining plastic materials. This screw tip may have a lower thread pitch than the screw tip 32 shown in FIG. 1 and may be grooved so as to cut through the materials being joined. Further, the width or spacing of the threads of this screw tip 92 may increase as they progress up the screw tip away from the point. Likewise, FIG. 9 depicts a grooved screw tip 94 having a higher thread pitch than the screw tips 32 & 92 shown in FIGS. 1 and 8. This screw tip 94 would cut through the workpiece materials (not shown).

Figure 10:
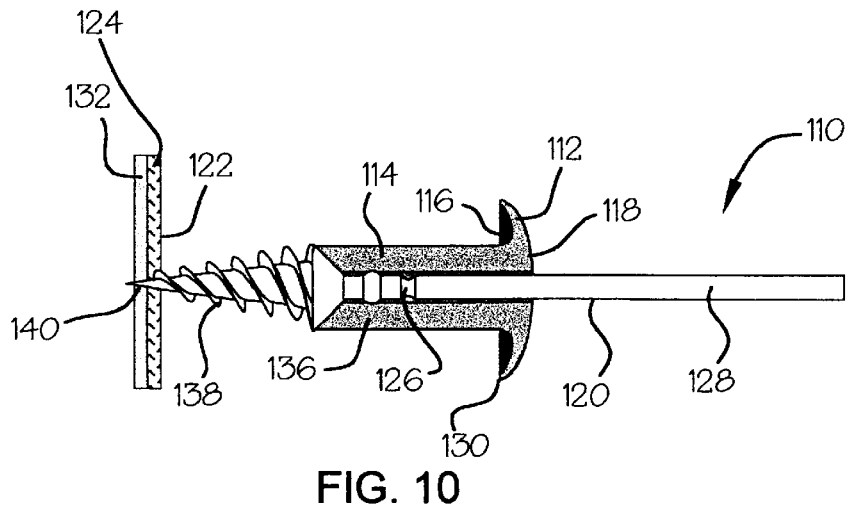
FIG. 10 is a partial cross-sectional side elevational view of an embodiment of the present invention wherein the enlarged flattened head of the rivet body may have a concave inner surface and a convex outer surface.
Figure 11:
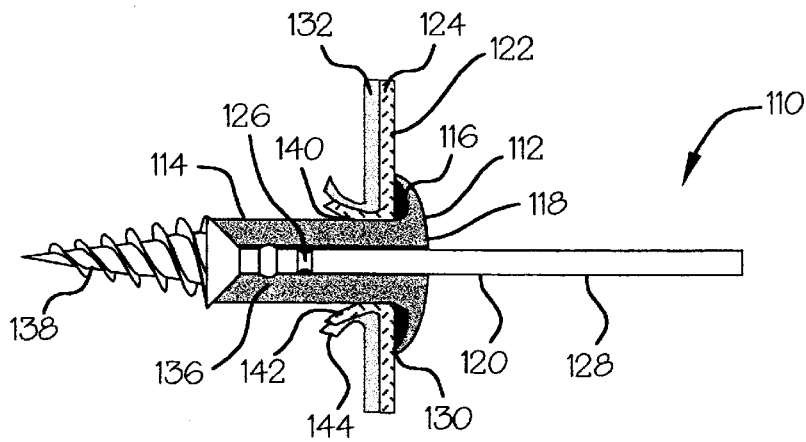
FIG. 11 is a partial cross-sectional side elevational view of the rivet assembly shown in FIG. 10 depicted after piercing of an aperture through adjacent work pieces.
Figure 12:
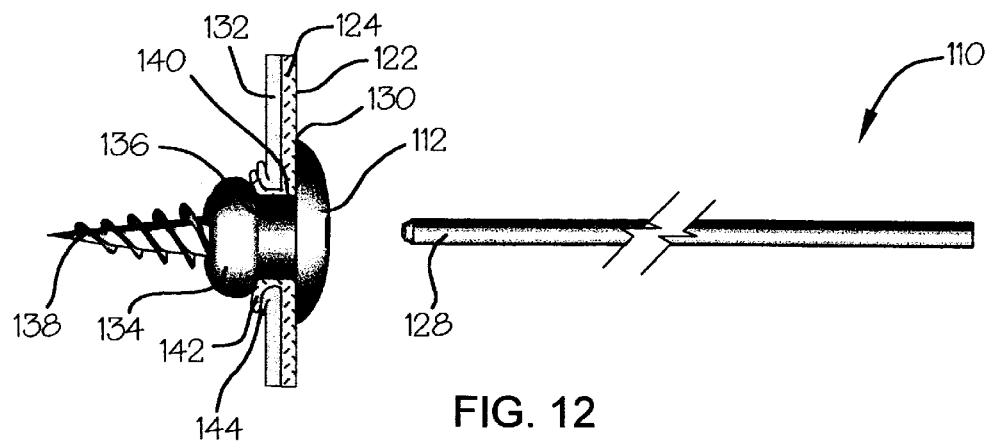
FIG. 12 is a side elevational view of the rivet assembly shown in FIG. 10 depicted after application.

FIGS. 10, 11 and 12 illustrate a self-tapping blind setting rivet assembly 110 according to another embodiment of the present invention wherein the enlarged flattened head 112 of the rivet body 114 may have a concave inner face 116 and a convex outer face 118. Preferably, as the rivet assembly 110 is applied, axial retraction of the mandrel 120 pulls the enlarged flattened head 112 against the outer surface 122 of the outer work piece 124, compressing and flattening its concave inner face 116. When the weakened area 126 on the mandrel 120 fractures and the shank 128 is released, the concave inner face 116 attempts to retain its original shape causing the rim 130 of the inner face to apply a spring-like force to the outer surface 122 of the outer workpiece 124. This force holds the work pieces (124 & 132) snugly between the head 112 and deformed portion 134 of the rivet body's sleeve 136. Although a rivet head 112 having a concave inner face 116 is shown in combination with a self-tapping blind setting rivet assembly according to the present invention, it would be obvious to one skilled in the art that this rivet head design could be applied to other types of rivets such as pop rivets, self-drilling rivets, or the like to provide superior retention of those rivet assemblies.

FIGS. 11 and 12 further illustrate how folding of the work piece materials may increase the strength of the attachment compared to a drilled hole. Here, the self-tapping blind setting rivet assembly 110 is used to join two relatively thin work pieces (124 & 132). As the self-tapping screw tip 138 punctures and expands the work piece materials (124 & 132) to create a hole or aperture 140, material 142 from the outer workpiece 124 may be folded through the aperture and wrapped around material 144 from the inner work piece 132. This material (124 & 144), may then be compressed beneath the deformed area 134 of the rivet body sleeve 136 and utilized to provide additional retention of the work pieces (124 & 132).

Discussion of FIGS. 13 through 31

Figure 13:
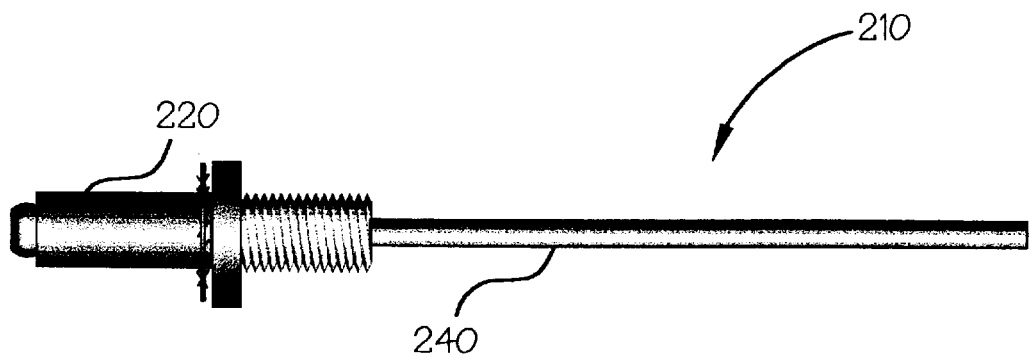
FIG. 13 is a side elevational view of a blind setting bolt rivet assembly according to an exemplary embodiment of the present invention.

FIG. 13 discloses a blind setting bolt rivet assembly 210 according to another exemplary embodiment of the present invention. Preferably, the rivet assembly 210 comprises a hollow rivet body 220 surrounding a mandrel 240. The rivet body 220 may be made of steel, aluminum, plastic, composite, or other desirable rivet material. The mandrel 240 may be made of steel, aluminum, plastic composite, or other material which is preferably of higher tensile strength than the rivet body material.

Figure 14:
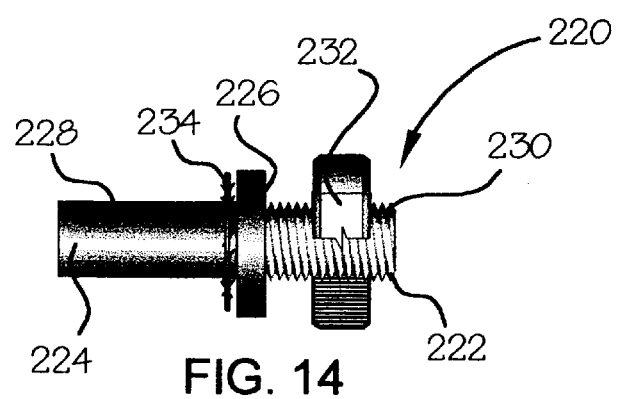
FIG. 14 is a side elevational view depicting the rivet body of the bolt rivet assembly shown in FIG. 13 having a nut threaded thereon.

FIG. 14 is a side elevational view depicting the rivet body 220 of the bolt rivet assembly 210 shown in FIG. 13. The rivet body 220 may comprise upper and lower ends 222 & 224 separated by an enlarged flattened head 226 adapted to abut the surface of a work piece (not shown). Preferably, the lower end 224 of the rivet body 220 comprises a hollow tubular sleeve 228 while the upper end 222 comprises a hollow threaded bolt head 230 onto which a nut 232 may be removably affixed to secure one or more work pieces or components (not shown). The rivet body 220 may further comprise a locking washer 234 to prevent rotation of the rivet body 220 within the work pieces when a nut 232 is tightened on the threaded bolt head 230. This washer 234 may encircle the rivet body sleeve and be trapped between the inner surface of the enlarged flattened head 226 and the upper surface of a work piece (not shown).

Figure 15:
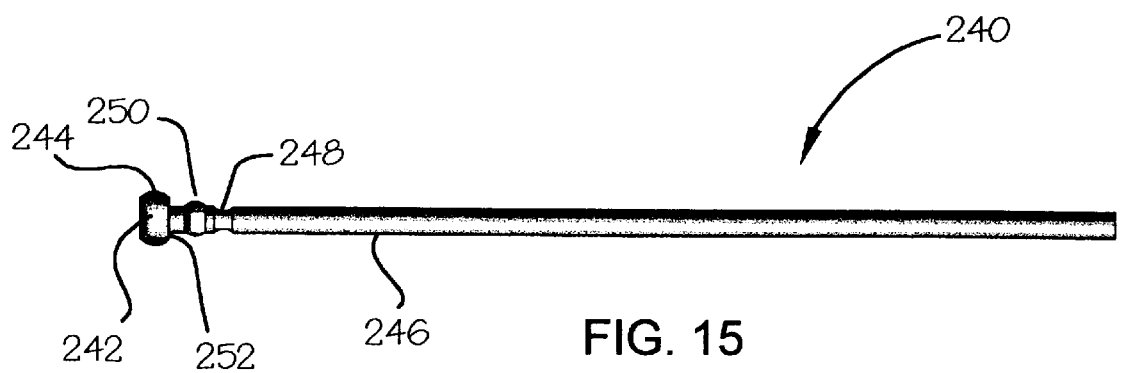
FIG. 15 is a side elevational view depicting the mandrel of the bolt rivet assembly shown in FIG. 13.

FIG. 15 is a side elevational view depicting the mandrel 240 of the bolt rivet assembly 210 shown in FIG. 13. The mandrel 240, which is disposed longitudinally within the rivet body (not shown), may comprise a shoulder section 242 having an outer diameter 244 greater than the inner diameter of the rivet body sleeve (not shown) and a rounded, tapered upper face 252. During application of the rivet, the shoulder section 242 may radially compress and spread the lower end of the sleeve (not shown) as the mandrel 240 is retracted rearward relative to the rivet body (not shown). The mandrel 240 may also comprise a shank 246 which may have a weakened area of reduced diameter 248 spaced rearward from the shoulder section 242. This weakened area 248 may be sized to allow the shoulder section 242 of the mandrel 240 to be detached from the shank 246 upon application of predetermined tensile force to the shank. Likewise, an area of enlarged diameter 250 may be formed on the shank 246 between the shoulder section 242 and the weakened area of reduced diameter 248. Preferably, this enlarged area 250 retains the shoulder section 244 within the sleeve (not shown), after application of the rivet, by creating an interference with the inner surface of the sleeve. This interference may be created as the sleeve is deformed during application of the rivet. The rear portion of the shank 246 may be designed for use with a specialized chuck (not shown) or various types of power or hand tools (not shown) to provide rotary motion and axial retraction to the mandrel 240.

Figure 16:
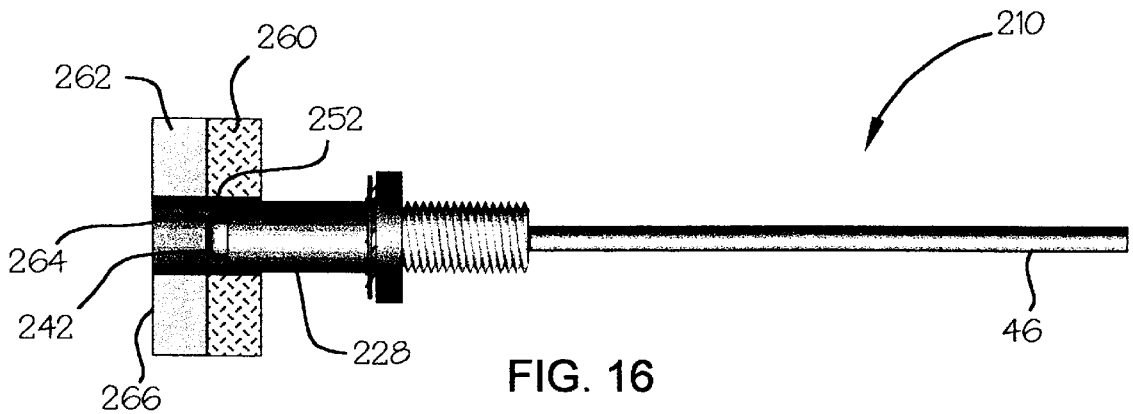
FIG. 16 is a side elevational view of the bolt rivet assembly shown in FIG. 13 depicting the rivet assembly prior to application through a pre-drilled aperture in the work pieces.
Figure 17:
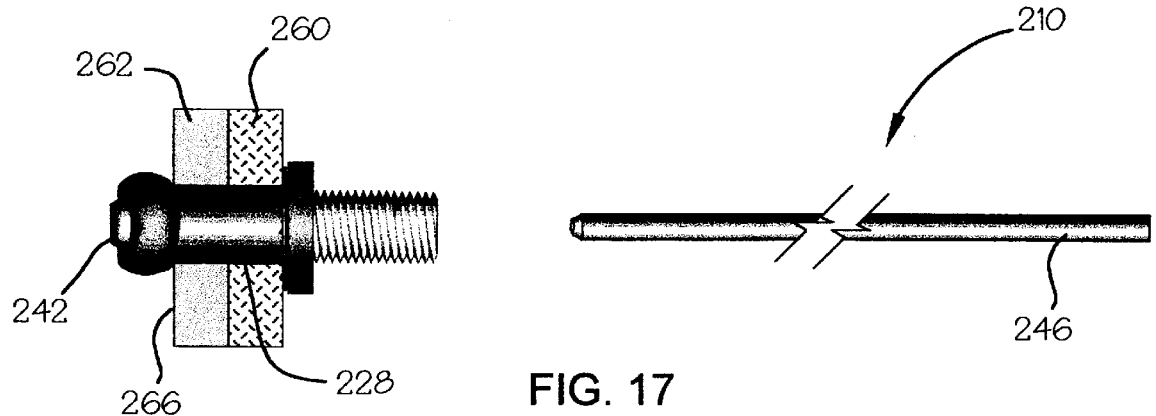
FIG. 17 is a side elevational view of the bolt rivet assembly shown in FIG. 13 depicting the rivet assembly following the application of an axial force on the rivet sleeve and detachment of mandrel shank.
Figure 18:
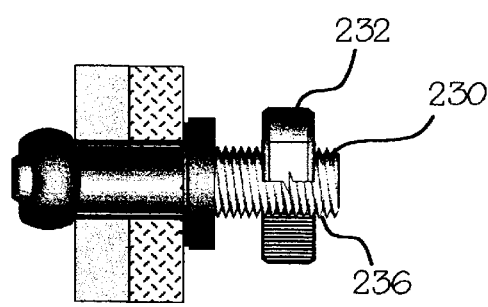
FIG. 18 is a side elevational view of the rivet assembly shown in FIG. 13 after application wherein a nut placed on outside threaded bolt head.

FIGS. 16 through 18 illustrate the application of the blind setting bolt rivet assembly 210 described in connection with FIGS. 13 through 15, to fasten together one or more sheet metal work pieces or the like. As shown in FIGS. 16 and 17, the bolt rivet assembly 210 may be applied to join two or more work pieces 260 & 262 by first inserting the sleeve 228 of the rivet assembly into an aperture 264 which may be pre-drilled through the work pieces. The rear portion of the mandrel shank 246 may then be grasped by a hand or power tool (not shown), and axially retracted. This axial retraction of the mandrel shank 246 causes the mandrel's shoulder section 242 to deform the rivet sleeve 228. As the shoulder section 242 is drawn into the rivet sleeve 228, the rounded, tapered upper face 252 of the shoulder section preferably spreads the sleeve radially. In this fashion, the rivet sleeve 228 may be spread until it will no longer pass through the aperture 264 in the work pieces 250 & 262, and is pulled securely against the inner surface 266 of the innermost work piece 262. The weakened area of reduced diameter (not shown) on the mandrel shank 246 may be sized to break at a predetermined tensile load. This load is preferably greater than the tensile load required to cause deformation of the rivet sleeve 228.

FIG. 18 is a side elevational view of the rivet assembly shown in FIG. 13 following application. The mandrel shank has been discarded and a standard nut 232 placed on the threaded bolt head 230. Additional work pieces, other components, or the like (not shown) may be removably attached to the threaded bolt head 230 and secured by the nut 232. Nuts may vary in design from six-sided or hex head nuts to wing nuts to various special shapes as required by the user. The threaded bolt head 230 may have threads 236 of various pitches depending on the needs of the user.

Figure 19:
FIG. 19 is a side elevational view of an alternative embodiment of the rivet assembly wherein the rivet body sleeve further comprises a plurality of longitudinal openings.

FIG. 19 is a side elevational view of an alternative embodiment of the rivet assembly wherein the rivet body sleeve further comprises a plurality of longitudinal openings 270. These longitudinal openings 270 may assist sleeve deformation by decreasing the required axial retraction force to complete application. The openings 270 may also increase application strength by forming a star-shape upon deformation of the sleeve. This sleeve design is preferred for heavy duty applications, but may be used for light duty applications as well.

Figure 20:
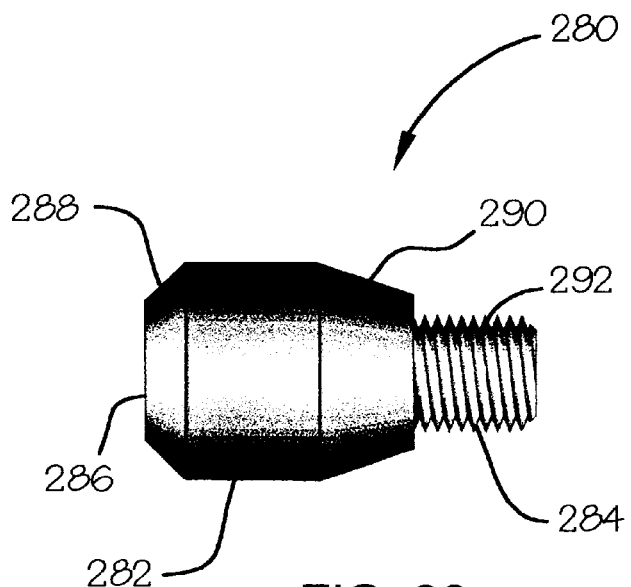
FIG. 20 is a side elevational view disclosing a preferred embodiment of an adaptor which may be used to apply the blind setting bolt rivet assembly to join two or more work pieces.

FIG. 20 is a side elevational view disclosing a preferred embodiment to of an adaptor which may be used to apply the blind setting bolt rivet assembly to join two or more work pieces. This adapter 280 may consist of a blank having generally cylindrical forward and rear sections 282 & 284. The forward section 282 may have a forward face 286 shaped to abut the rivet head of the bolt rivet assembly (not shown). This forward section 282 may also have tapered front and back outer surfaces 288 & 290 to provide a more comfortable grip for the user. The rear section 284 may have a threaded outer circumference 292 to allow attachment of a hand or power tool (not shown).

Figure 21:
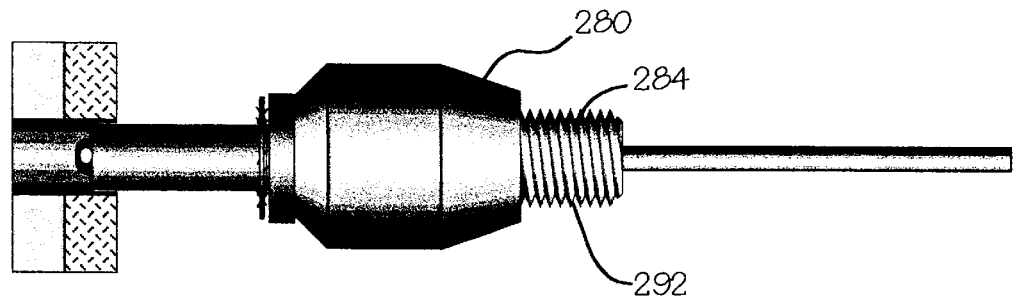
FIG. 21 is a side elevational view depicting a bolt rivet assembly inserted in the adapter shown in FIG. 20 prior to application of the rivet.

FIGS. 21 through 24 illustrate the process for applying the bolt rivet assembly shown in FIG. 20 to join two work pieces. FIG. 21 is a side elevational view depicting a bolt rivet assembly inserted in the adapter shown in FIG. 20 prior to application of the rivet. The rear section 284 of the adapter 280 may have a threaded outer circumference 292 so that the adapter may be secured to a hand or power tool (not shown).

Figure 22:
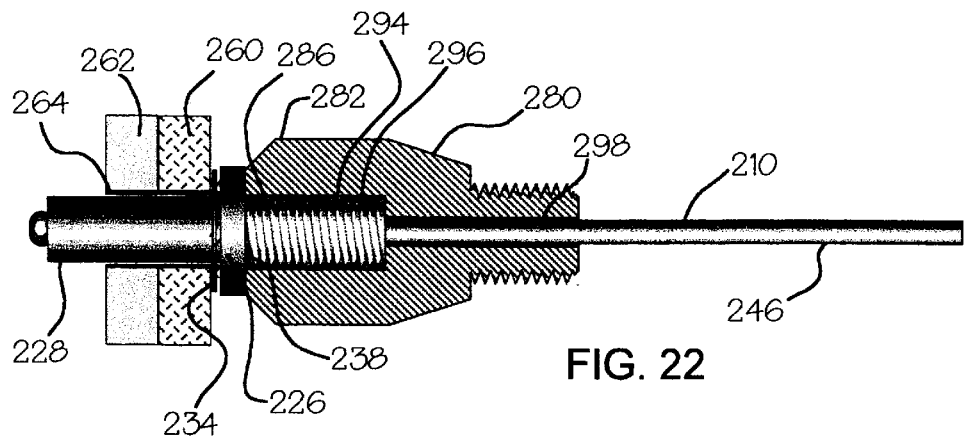
FIG. 22 is a partial cross-sectional elevational view depicting a bolt rivet assembly inserted in the adapter shown in FIG. 20 prior to retraction of the mandrel.

FIG. 22 is a partial cross-sectional elevational view depicting a bolt rivet assembly inserted in the adapter shown in FIG. 20 prior to retraction of the mandrel. Preferably, the adapter 280 has a cylindrical aperture 294 shaped to removably accept the threaded bolt head 230 and mandrel shank 246 of the bolt rivet assembly 210. This aperture 294 may extend longitudinally through the center of adapter 280 and may consist of a forward cavity 296 having a diameter and length slightly greater than the diameter and length of the threaded bolt head 230 and a rear cavity 298 having a diameter slightly greater than the outer diameter of the mandrel shank 246. The threaded bolt head 230 and mandrel shank 246 of the bolt rivet assembly 210 may be inserted into the adapter 280 so that the forward face 286 of the forward section 282 of the adapter abuts the outer face 238 of the rivet head 226.

FIGS. 21 through 24 also illustrate how the sleeve 228 of the rivet assembly 210 may be inserted into a pre-drilled aperture 264 through the work pieces 260 & 262 so that the rivet assembly and adapter 280 are positioned perpendicular to the outer surface 268 of the outermost work piece 260. Preferably, the rivet head 226 traps the locking washer 234 against the outer surface 268 of the outermost work piece 260.

Figure 23:
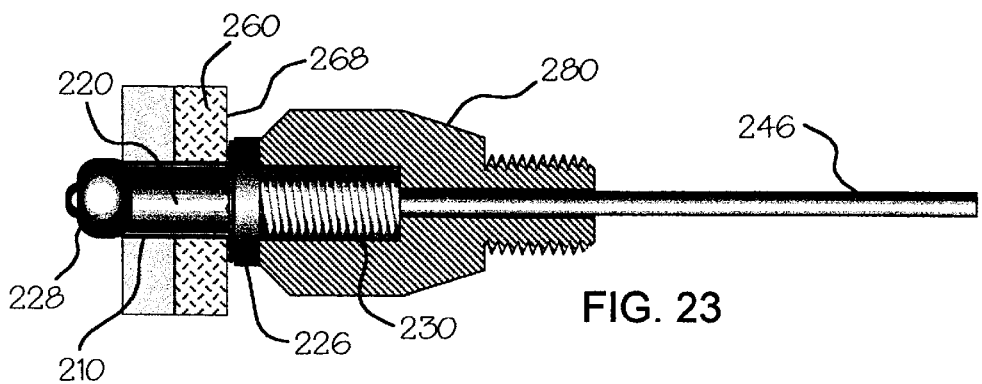
FIG. 23 is a partial cross-sectional elevational view depicting a bolt rivet assembly inserted into the adapter shown in FIG. 20 illustrating the deformation of the rivet sleeve by axial retraction of the mandrel.

FIG. 23 is a partial cross-sectional elevational view of the adapter shown in FIG. 20 having a bolt rivet assembly inserted therein depicted prior to separation of the shank. The rear portion of the mandrel shank 246 may be grasped by a hand or power tool (not shown) and axially retracted. Retraction of the shank 246 sets the rivet by deforming the tubular sleeve 228 of the rivet body 220. Preferably, the adapter 280 prevents the rivet body's threaded bolt head 230 from being deformed or damaged during this part of the application process. The adapter 280 may also assist the user in holding the rivet head 226 flush to the outer surface 268 of the outermost work piece 260.

Figure 24:
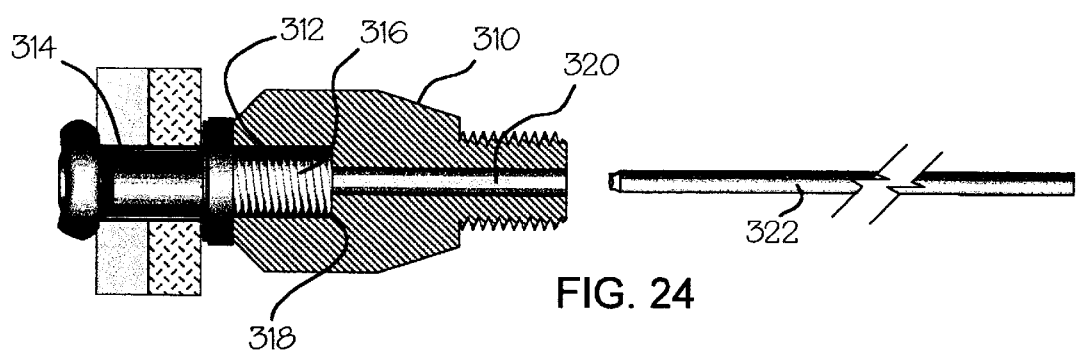
FIG. 24 is a partial cross-sectional elevational view of a bolt rivet assembly inserted in an alternative embodiment of the adaptor depicted after separation of the mandrel shank.

FIG. 24 is a partial cross-sectional elevational view of an alternative embodiment of the adapter. This adapter 310 may have an aperture 312 shaped to fit a bolt rivet assembly 314 having a shortened threaded bolt head 316. Preferably, the depths and diameters of the forward and rear cavities 318 & 320 of the aperture 312 may be sized to correspond the configuration of any bolt rivet assembly used. FIG. 24 depicts an adapter and bolt rivet assembly after separation of the mandrel shank 322.

Figure 25:
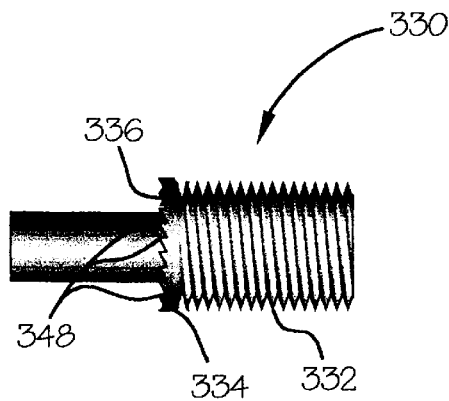
FIG. 25 is a side elevational view depicting an embodiment of a one piece rivet body including a head having serrations on its inner surface to prevent rotation of the rivet body.
Figure 26:
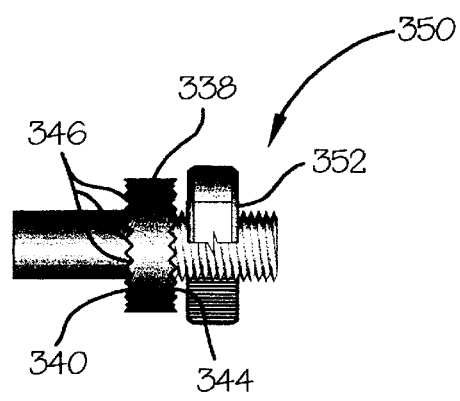
FIG. 26 is a side elevational view depicting an embodiment of the rivet body having a head comprising serrations on both faces to prevent rotation of the rivet body.

In FIG. 25, another embodiment of a rivet body 330 is depicted comprising a one piece unit having a threaded bolt head 332 which may be the same diameter as the enlarged flattened head portion 334. The head may have a serrated inner face 336 instead of a locking washer (not shown). Alternatively, a one piece rivet body may be fashioned having a smooth forward surface allowing the use of a lock washer if desired. As further illustrated in FIG. 26, the rivet body's head 338 may have both inner 340 and outer 344 faces serrated depending upon application needs. These serrations 346 function to increase surface friction between the rivet head 338 and the outer surface of the outer work piece (not shown) to prevent rotation of rivet. Serrations 346 may be formed to prevent rotation of the bolt rivet during loosening and/or tightening of the nut. For example, FIG. 25 illustrates a head 336 having serrations 348 formed to prevent rotation of the rivet body 330 in one direction, i.e. as a nut (not shown) is tightened, while FIG. 26 illustrates a head 338 having serrations 346 formed to prevent rotation of the rivet body 350 in both directions, i.e. as the nut 332 is both tightened and loosened.

Figure 27:
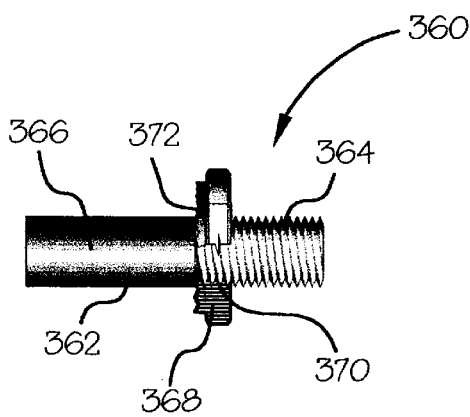
FIG. 27 is a side elevational view depicting an embodiment of the rivet body comprising a sleeve consisting of a partially threaded tube and a separate enlarged flattened head having a serrated inner face to prevent rotation of the rivet body.

The head of the rivet body may be part of a single piece rivet unit or it may be removable. In FIG. 27, a rivet body 360 is depicted formed from a single tube 362 having a threaded portion 364 the same diameter as the sleeve portion 366. A removable separate enlarged flattened head 368 may have a threaded aperture 370 so that it may be threaded onto this threaded portion 364. This removable head 368 may have a six-sided or hex design similar to a standard nut or alternatively may be cylindrical. Additionally, the head 368 may have serrated inner 372 and outer (not shown) surfaces and may be of various thicknesses depending upon the application's requirements.

Figure 28:
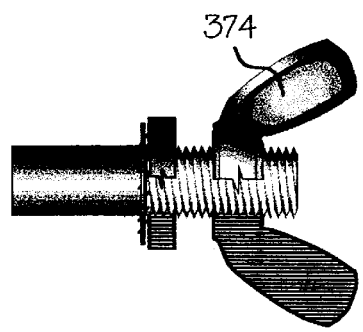
FIG. 28 is a side elevational view depicting an embodiment of the rivet body comprising a sleeve consisting of a partially threaded tube, a separate enlarged flattened head, lock washer and wing nut.

In certain applications, it may be desirable for the threaded portion of the rivet body to have multiple sets of threads. A separate head may be fashioned so that its internal threads may be stripped by these multiple threads as it is being threaded onto the rivet body. Thus, once threaded onto the threaded portion, the head cannot be removed. In this fashion, the head may be tightened onto the rivet body and permanently retained. A second nut may be fashioned having a thread pattern corresponding to that of the rivet body so that it will not be stripped and consequently may be removable. As illustrated in FIGS. 26 and 28, nuts may vary from six-sided or hex head nuts 352 and wing nuts 374 to various special shapes as required by the user.

Figure 29:
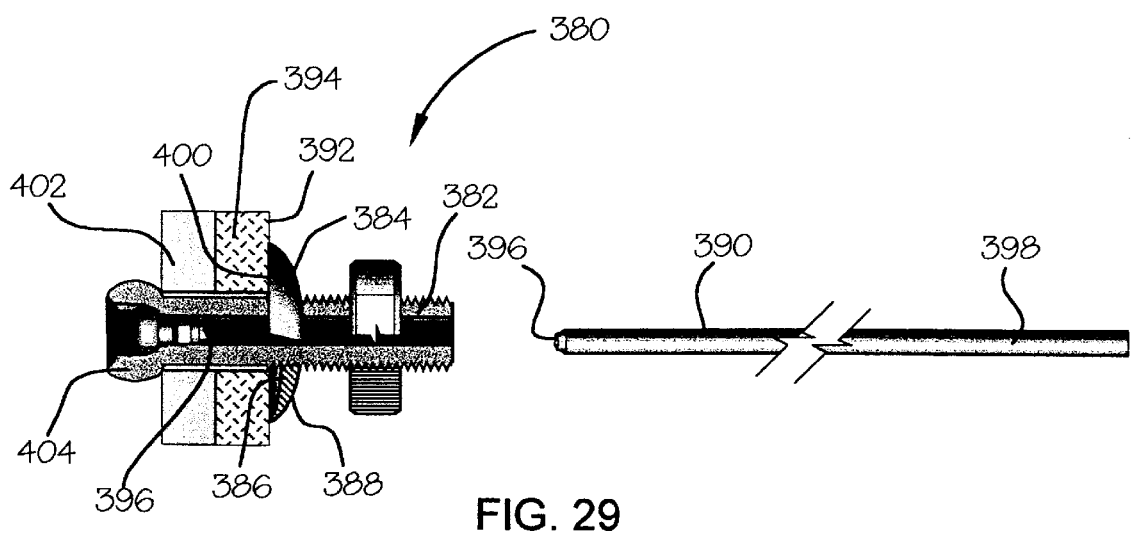
FIG. 29 is a side elevational view depicting an embodiment of the rivet body comprising an enlarged flattened head having a concave inner surface.

FIG. 29 depicts a rivet assembly 380 comprising a rivet body 382 including a head 384 having a concave inner face 386 and convex outer face 388. This head 384 may be of various diameters depending upon the application's requirements. Preferably, as the rivet assembly 380 is applied, axial retraction of the mandrel 390 pulls the enlarged flattened head 384 against the outer surface 392 of the outer work piece 394, compressing and flattening its concave inner face 386. When the weakened area 396 on the mandrel 390 fractures and the shank 398 is released, the concave inner face 386 attempts to retain its original shape causing the rim 400 of the inner face to apply a spring-like force to the outer surface 392 of the outer workplace 394. This force holds the work pieces (394 & 402) snugly between the head 384 and deformed portion of the rivet body's sleeve 404. As a result, the head 384 may increase application strength and prevent rotation of the rivet body 382 with or without a locking washer or serrated inner surface (not shown).

Figure 30:
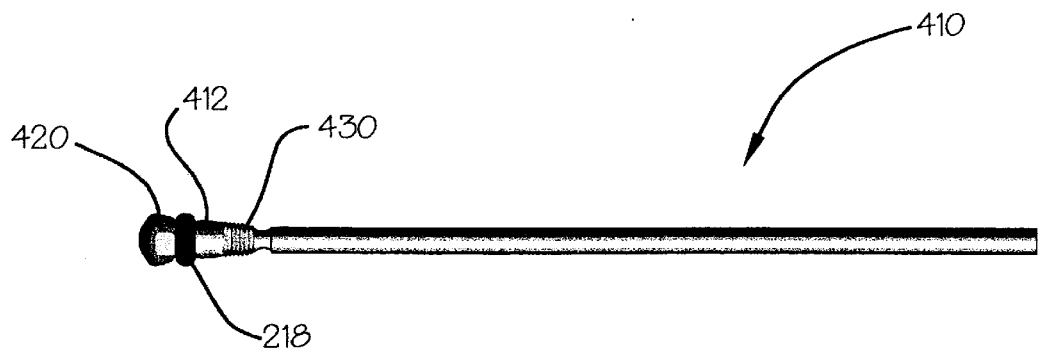
FIG. 30 is a side elevational view depicting an embodiment of the mandrel modified to enable the rivet assembly to be liquid and gas impervious.
Figure 31:
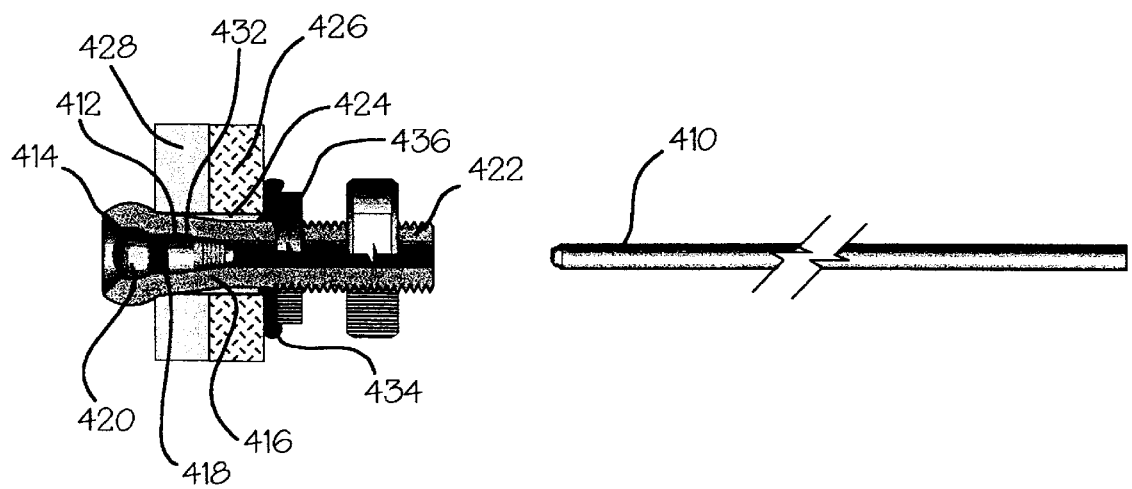
FIG. 31 is a partial cross-sectional side elevational view depicting a bolt rivet assembly employing the mandrel shown in FIG. 30.

FIGS. 30 and 31 depict an embodiment of a mandrel 410 modified to enable the rivet assembly to be environmentally sealed so as to be impervious to liquids and gases. An enlarged shank portion 412 may have an elongated conical shape to seal the aperture 414 of the tubular sleeve 416. A grommet or gasket 418 made of rubber, vinyl, plastic or the like may be added between the shoulder section 420 and this portion 412 to ensure a proper seal. Additionally, as the enlarged shank portion 412 is pulled into the sleeve 416 of the rivet body 422, its conical shape may radially expand the rivet body sleeve against the aperture 424 in the work pieces (426 & 428) forming a liquid and gas tight seal. The enlarged shank portion, 412 may also have a plurality of ridges 430 to secure the forward shank 432 in the sleeve 416 preventing it from backing out. Additionally, a washer or gasket 434 made of rubber, vinyl, plastic, or the like may be disposed between the outer work piece 426 and the head 436 of the rivet body 422 to provide additional sealing capability. While these sealing features are illustrated in combination with a bolt rivet assembly according to the present invention, it should be obvious to one skilled in the art that they may be applied to other blind setting rivet assemblies as well.

Discussion of FIGS. 32 through 51

Figure 32:
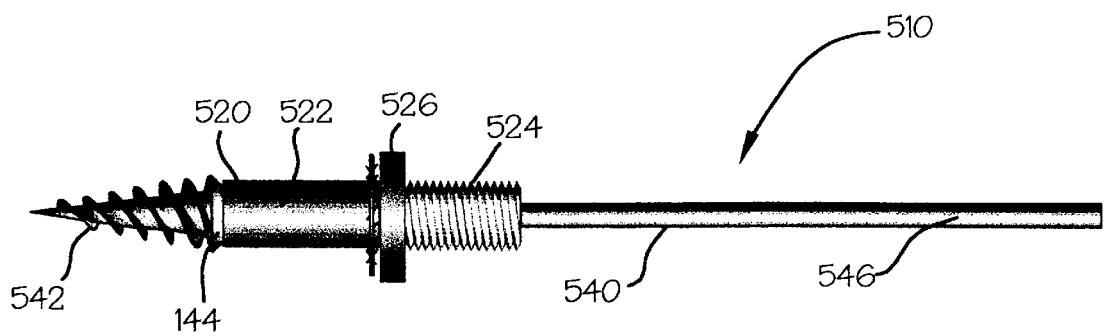
FIG. 32 is a side elevational view of a self-tapping blind setting bolt rivet assembly according to an exemplary embodiment of the present invention.

FIG. 32 discloses a self-tapping, blind setting bolt rivet assembly according to an exemplary embodiment of the present invention. The rivet assembly 510 preferably comprises a hollow rivet body 520 surrounding a mandrel 540. Preferably, the rivet body 520 comprises a hollow tubular sleeve 522 and a threaded bolt head 542 separated by an enlarged flattened head or flange 526. The rivet body 520 may be made of steel, aluminum, plastic, composite, or other desirable rivet material. The mandrel 540 may comprise a self-tapping screw tip 542, shoulder section 544, and shank 546. The mandrel 540 may be made of steel, aluminum, plastic composite, or other material which is preferably of higher tensile strength than the rivet body material.

Figure 33:
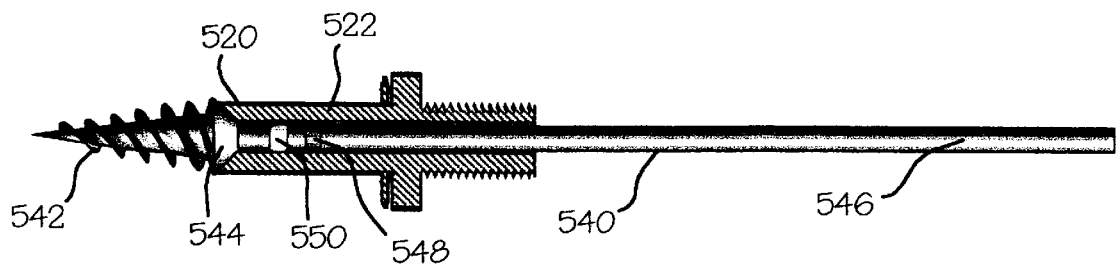
FIG. 33 is a partial cross-sectional side elevational view of the rivet assembly shown in FIG. 32 illustrating the rivet body and mandrel.

FIG. 33 provides a cross-sectional view of the rivet body 520 and discloses additional features of the mandrel 540. A weakened area of reduced diameter 548 may be formed on the mandrel shank 546 rearward from the shoulder section 544. This weakened area 548 is preferably sized to allow the screw tip 542 and shoulder section to be detached from the shank 546 upon application of predetermined tensile force to the shank. Likewise, an area of enlarged diameter 550 may be formed on the shank 546 between the shoulder section 544 and the weakened area of reduced diameter 548. Preferably, this enlarged area 550 retains the screw tip 542 and shoulder section 544 within the sleeve 522 after application of the rivet by creating an interference with the inner surface of the sleeve. This interference may be created as the sleeve 522 is deformed during application of the rivet.

Figure 34:
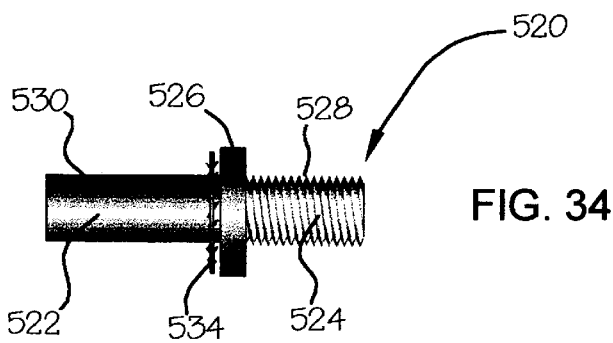
FIG. 34 is a side elevational view depicting the rivet body of the bolt rivet assembly shown in FIG. 32.

FIG. 34 is a side elevational view depicting the rivet body of the bolt rivet assembly shown in FIG. 32. The rivet body 520 may comprise upper and lower ends (528 & 530) separated by an enlarged flattened head 526 adapted to abut the surface of a work piece (not shown). Preferably, the lower end 530 of the rivet body 520 comprises a hollow tubular sleeve 522 while the upper end 528 comprises a hollow cylindrical threaded bolt head 524 onto which a nut may be removably affixed to secure one or more work pieces or components (not shown). The rivet assembly may further comprise a locking washer 534 to prevent rotation of the rivet body 520 within the work pieces when a nut is tightened on the threaded bolt head 524 (see FIG. 38). This washer 534 may encircle the rivet body sleeve 522 and be trapped between the enlarged flattened head or flange 526 and the upper surface of a work piece (not shown).

Figure 35:
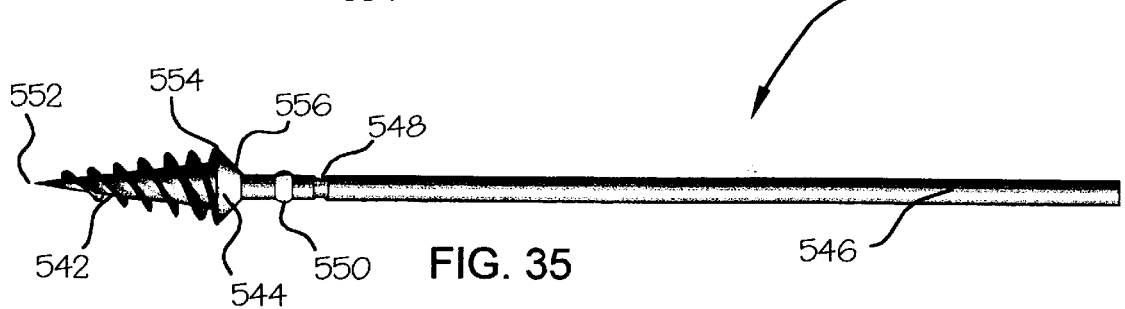
FIG. 35 is a side elevational view depicting the mandrel of the bolt rivet assembly shown in FIG. 32.

FIG. 35 is a side elevational view depicting the mandrel of the bolt rivet assembly shown in FIG. 32. The mandrel 540 which is disposed longitudinally within the rivet body (not shown), may comprise a screw tip 542, a shoulder section 544 and a shank 546. The screw tip 542 may form a hole or aperture in a work piece (not shown) by puncturing and separating the work piece materials. Preferably, the screw tip 542 is essentially a standard sheet metal screw except that it may have a more pointed tip 552 to facilitate piercing of the outer work piece surface. The shoulder section 544 located adjacent to the screw tip 542 may comprise a tapered upper face 556 having an outer diameter 554 greater than the inner diameter of the rivet body sleeve (see FIG. 33). During application of the rivet, the shoulder section 542 may radially compress and spread the lower end of the sleeve as the mandrel 540 is retracted rearward relative to the rivet body. The mandrel shank 546 may have a weakened area of reduced diameter 548 spaced rearward from the shoulder section 544. This weakened area 548 may be sized to allow the shoulder section 544 of the mandrel 540 to be detached from the shank 546 upon application of predetermined tensile force to the shank. Likewise, an area of enlarged diameter 550 may be formed on the shank 546 between the shoulder section 544 and the weakened area of reduced diameter 548. Preferably, this enlarged area 550 retains the screw tip 542 and shoulder section 544 within the sleeve (not shown), after application of the rivet, by creating an interference with the inner surface of the sleeve. This interference may be created as the sleeve is deformed during application of the rivet. The rear portion of the shank 546 may be designed for use with a specialized chuck (not shown) or various types of power or hand tools (not shown) to provide rotary motion and axial retraction to the mandrel 540.

Figure 36:
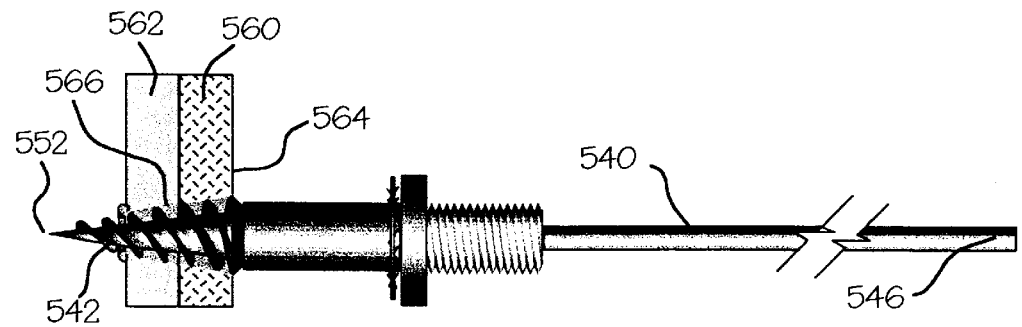
FIG. 36 is a side elevational view of the rivet assembly shown in FIG. 32 depicting the rivet assembly at initial application.
Figure 37:
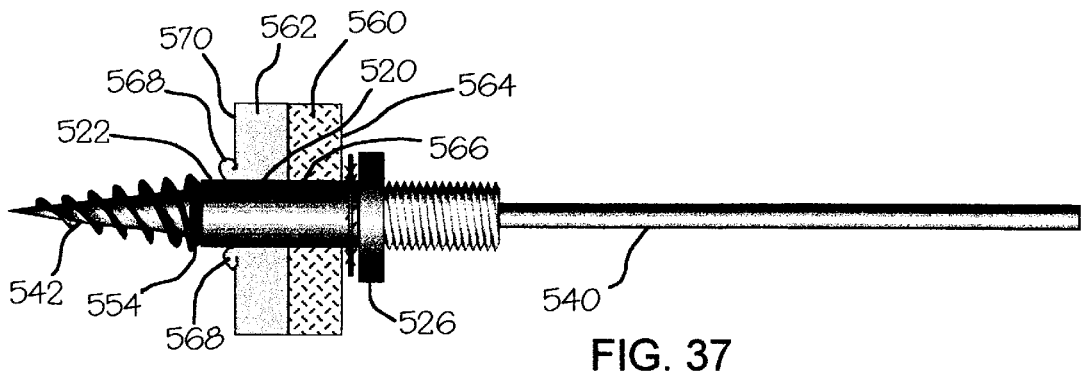
FIG. 37 is a side elevational view of the rivet assembly shown in FIG. 32 depicting the rivet assembly following the separation and folding of an aperture through the work piece materials by the screw tip.
Figure 38:
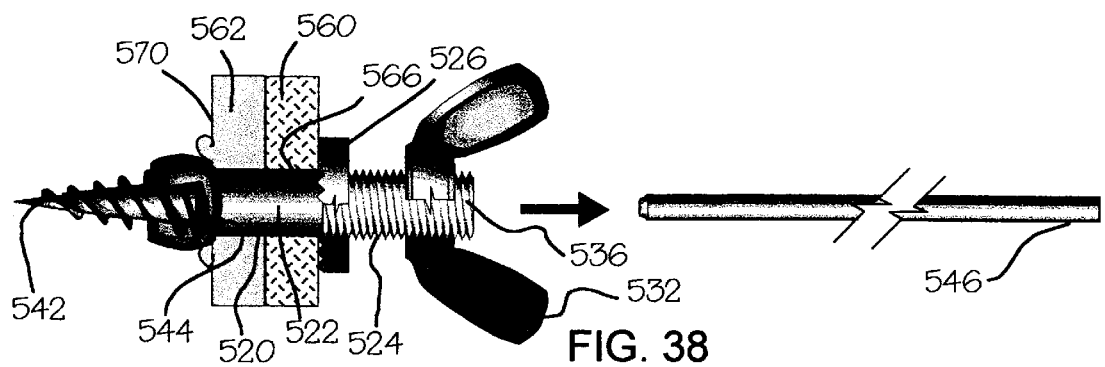
FIG. 38 is a partial cross-sectional side elevational view of the bolt rivet assembly shown in FIG. 32 depicting the rivet assembly following the application of an axial force on the rivet sleeve, detachment of mandrel shank and addition of a wing nut to the threaded bolt head.

FIGS. 36 through 38 illustrate the application of the self-tapping, blind setting bolt rivet assembly, described in connection with FIG. 32, to fasten together one or more sheet metal work pieces or the like. FIG. 36 is a side elevational view depicting the screw tip 542 of the rivet assembly 510 piercing two adjacent work pieces (560 & 562) at initial application. The self-tapping screw tip 542 may be held normal to the outer work piece surface 564 while rotary motion is applied to the mandrel shank 546 to pull the screw tip into the work piece materials (560 & 562). The screw tip 542 may form a hole or aperture 66 in the work pieces (560 & 562) by puncturing and separating the work piece materials. Preferably, the screw tip 542 is essentially a standard sheet metal screw except that it may have a more pointed tip 552 to facilitate piercing of the outer work piece surface 564. The rear portion of the shank 546 may be designed for use with a specialized chuck (not shown) or various types of power or hand tools (not shown) to provide rotary motion and axial retraction to the mandrel 540.

FIG. 37 is a side elevational view of the rivet assembly illustrated in FIG. 32 following the separation and folding of an aperture through the work piece materials by the screw tip. By using a power or hand tool (not shown), rotary motion may be applied to the mandrel 540 causing the self-tapping screw tip 542 to tap a hole or aperture 566 in adjacent work pieces (560 & 562). As the self-tapping screw tip 542 punctures and spreads the work piece materials, material 568 on the inner surface 570 of the innermost work piece 562 may be separated and folded longitudinally. This folding increases the strength of the attachment compared to a drilled hole. Preferably, the outer diameter of the shoulder section 554 of the mandrel 540 is slightly larger than outer diameter of rivet sleeve 522 allowing the sleeve to pass through the hole or aperture 566 formed. The enlarged flattened head 526 of the rivet body 520 may abut on the outer surface 564 of the outer work piece 560 and may be retained there during application of the rivet by an adaptor or the like (see FIG. 51).

FIG. 38 is a partial cross-sectional side elevational view of the rivet assembly shown in FIG. 32 depicting the rivet assembly following the application of a rearward tension force on the mandrel shank. The rear portion of the shank 546 may be grasped by a riveting tool or the like (not shown), and axially retracted. This axial retraction of the mandrel shank 546 causes the mandrel's shoulder section 544 to deform the rivet sleeve 522. As the shoulder section 544 and screw tip 542 are drawn into the rivet sleeve 522, the tapered upper face (not shown) of the shoulder section spreads the sleeve radially. In this fashion, the rivet sleeve 522 may be spread until it will no longer pass through the aperture 566 in the work pieces (560 & 562), and is pulled securely against the inner surface 570 of the innermost work piece 562. The weakened area of reduced diameter (not shown) on the mandrel shank 546 may be sized to break at a predetermined tensile load. This load is preferably greater than the tensile load required to cause deformation of the rivet sleeve 522. FIG. 38 illustrates this deformation, which when coupled with the folding of the work piece material, forms a very strong attachment.

In the embodiment shown in FIG. 38, the screw tip 542 and shoulder section 544 may be retained in the rivet sleeve 522 of the rivet body 520 due to an interference between the enlarged area of the shank 546 and rivet sleeve. This interference may be created by deformation of the rivet sleeve 522 during application. Likewise, the tapered upper face of the shoulder section 544 may deform the rivet sleeve 522 so as to encircle the screw tip 542 to provide additional retention of the screw tip after application of the rivet.

The head of the rivet body may be part of a single piece rivet unit or it may be removable. In FIG. 38, a rivet body 520 is depicted formed from a single tube having a threaded bolt head 524 the same diameter as the sleeve portion 522. The enlarged flattened head 526 may be a separate component and may have a threaded aperture so that it may be threaded onto the bolt head 524. This enlarged flattened head 526 may be cylindrical or alternatively may have a six-sided or hex design similar to a standard nut. Additionally, the rivet body's head 526 may have its inner and outer faces serrated. These serrations may function to increase surface friction between the rivet head and the outer surface of a work piece to prevent rotation of rivet thus eliminating the need for a lock washer (not shown). Serrations may be formed to prevent rotation of the bolt rivet during loosening and/or tightening of a nut 532.

Figure 39:
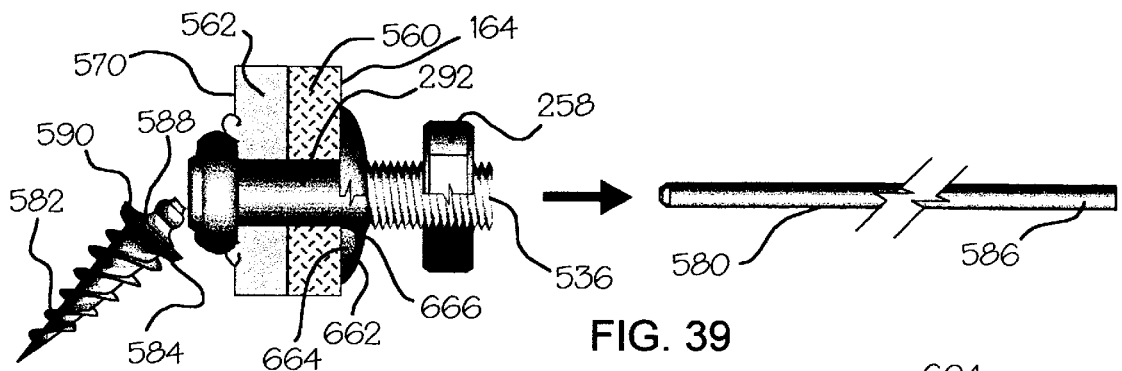
FIG. 39 is a partial cross-sectional side elevational view of an alternative embodiment of the present invention depicting the detachment of the screw tip and shoulder section following application and addition of a nut to the threaded bolt head.

FIG. 39 is a partial cross-sectional side elevational view of an alternative embodiment of the present invention depicting the detachment of the screw tip 582 and shoulder section 584 following application of the rivet. In this embodiment, wherein the screw tip 582 is allowed to drop off, the shoulder section 584 of the mandrel 580 may have an upper face consisting of a tapered inner section 588 and a flat-plate outer section 590. Preferably, the tapered inner section 588 initially spreads the lower end of the rivet sleeve 592. The flat-plate outer section 590 then flattens the sleeve 592 against the inner surface 570 of the innermost work piece 562 allowing the screw tip 582 and shoulder section 584 to drop off following application of the rivet.

FIG. 39 further depicts a rivet body comprising a head 662 having a concave inner face 664 and convex outer face 666. This head 662 may be of various diameters depending upon the application's requirements. Preferably, as the rivet assembly is applied, axial retraction of the mandrel 580 pulls the enlarged flattened head 662 against the outer surface 564 of the outer work piece 560, compressing and flattening its concave inner face 664. When the weakened area (not shown) on the mandrel 580 fractures and the shank 586 is released, the concave inner face 664 attempts to retain its original shape causing the rim 668 of the inner face to apply a spring-like force to the outer surface 564 of the outer workpiece 560. This force holds the work pieces (560 & 582) snugly between the head 662 and deformed portion of the rivet body's sleeve 592. As a result, the head 662 may increase application strength and prevent rotation of the rivet body with or without a locking washer or serrated inner surface (not shown).

In FIGS. 38 and 39, a wing nut 532 and a standard nut 558, respectively, are shown placed on the threaded bolt head 524. Additional work pieces, other components, or the like (not shown) may be removably attached to the threaded bolt head 524 and secured by the nut. The threaded bolt head 524 may have threads 536 of various pitches depending on the needs of the user.

Figure 40:
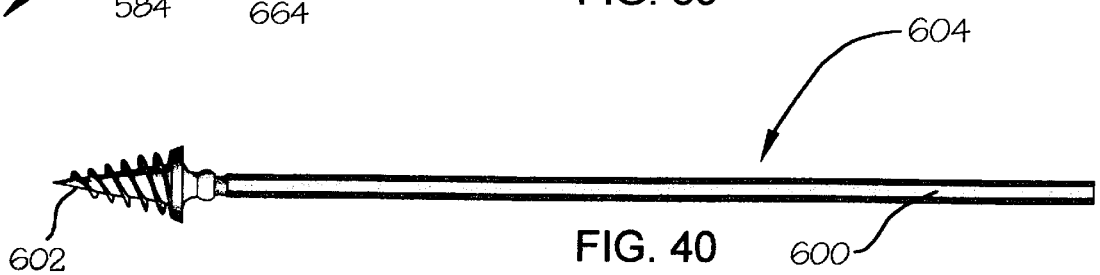
FIG. 40 is a side elevational view of an alternative embodiment of the mandrel having a modified six-sided shank.

FIG. 40 is a side elevational view of an alternative embodiment of the mandrel 604 having a modified six-sided shank 600 and a modified screw tip 602. This six-sided shank 600 may be desirable for heavy duty applications. The shank illustrated in FIG. 40 is formed without an enlarged area so as to allow the screw tip 602 to drop off after application. Further, the screw tip 602 is modified, having a lower thread pitch than the screw tip shown in FIG. 32. A grooved screw tip (see FIG. 9) or screw tips having different points and thread pitches may be used depending on the materials being joined.

Figure 41:
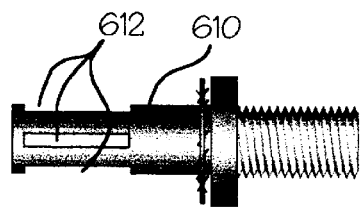
FIG. 41 is a side elevational view of the rivet body of an alternative embodiment the of the rivet assembly wherein the rivet body sleeve further comprises a plurality of longitudinal openings.
Figure 42:
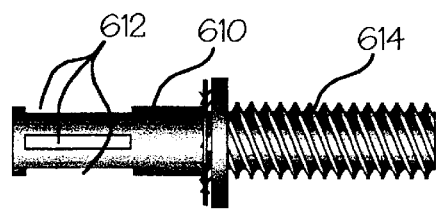
FIG. 42 is a side elevational view a further embodiment the of the rivet body shown in FIG. 41 having a modified threaded bolt head.

FIGS. 41 and 42 are side elevational views of alternative embodiments of the rivet assembly wherein the rivet body sleeve 610 further comprises a plurality of longitudinal openings 612. FIG. 42 also illustrates a rivet body wherein the threaded bolt head 614 has a modified thread design. In certain applications, it may be desirable for the threaded portion of the rivet body to have multiple sets of threads. A separate head may be fashioned so that its internal threads may be stripped by these multiple threads as it is being threaded onto the rivet body. Thus, once threaded onto the threaded portion, the head cannot be removed. In this fashion, the head may be tightened onto the rivet body and permanently retained. A second nut may be fashioned having a thread pattern corresponding to that of the rivet body so that it will not be stripped and consequently may be removable.

Figure 43:
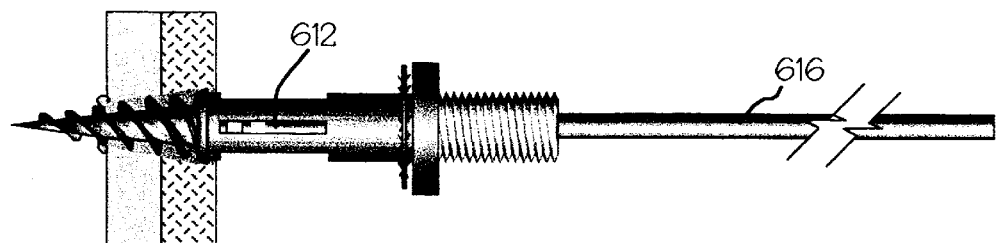
FIG. 43 is a side elevational view of a bolt rivet assembly, having a rivet body according to the embodiment shown in FIG. 41, depicting the threaded screw of the rivet assembly piercing a work piece at initial application.
Figure 44:
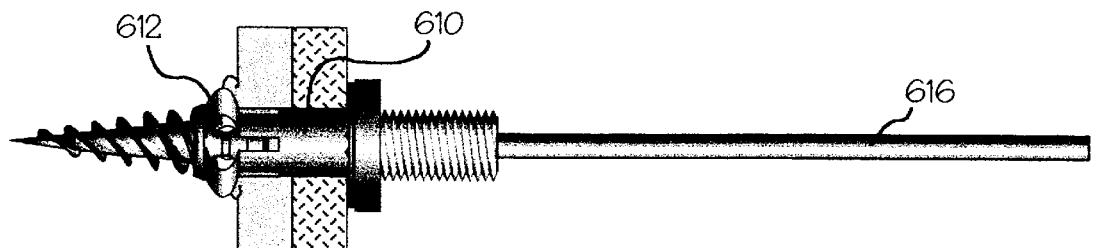
FIG. 44 is a side elevational view of the rivet assembly shown in FIG. 43 depicting the rivet assembly following the separation and folding of an aperture through work piece materials by the screw tip.
Figure 45:
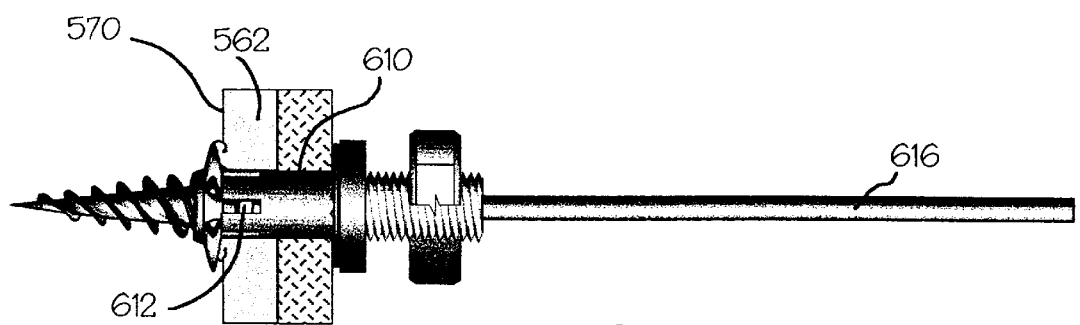
FIG. 45 is a partial cross-sectional side elevational view of the bolt rivet assembly shown in FIG. 44 depicting the rivet assembly following the application of an axial force on the rivet sleeve and detachment of mandrel shank.

As shown in FIGS. 43 through 45, the longitudinal openings 612 disclosed in FIGS. 41 and 42 may assist sleeve deformation by decreasing the area of the rivet sleeve 610 that must be deformed, thus reducing the required axial retraction force to complete application. This sleeve design is preferred for heavy duty applications, but may be used for light duty applications as well.

FIG. 43 is a side elevational view of the rivet assembly shown in FIG. 41 depicting the screw tip of the rivet assembly piercing a work piece at the beginning of application.

FIG. 44 is a side elevational view of the rivet assembly shown in FIG. 41 depicting the rivet assembly following the separation and folding of an aperture through the work piece materials by the screw tip. The area of the rivet sleeve 610 having the longitudinal openings 612 is shown partially deformed by the application of an axial force to the mandrel shank 616.

FIG. 45 is a partial cross-sectional side elevational view of the bolt rivet assembly shown in FIG. 41 depicting the rivet assembly following the application of an axial force on the rivet sleeve and detachment of mandrel shank. The area of the rivet sleeve 610 having the longitudinal openings 612 is shown fully deformed, being completely flattened and spread against the inner surface 570 of the innermost work piece 562. At a predetermined tensile force which is greater than the force required to completely deform the rivet sleeve 612, the weakened area of the mandrel shank 616 breaks releasing the shank for the rivet assembly. The shank 616 may then be discarded.

Figure 46:
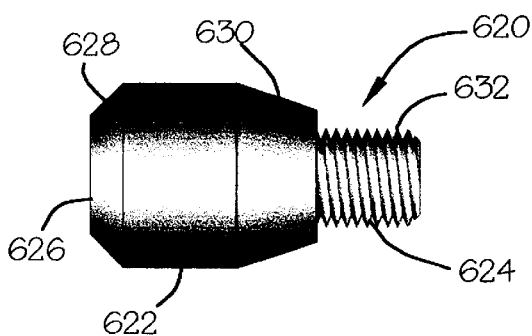
FIG. 46 is a side elevational view disclosing a preferred embodiment of an adaptor which may be used to apply the self-tapping, blind setting bolt rivet assembly to join one or more work pieces.

FIG. 46 is a side elevational view disclosing a preferred embodiment of an adaptor which may be used to apply the self-tapping, blind setting bolt rivet assembly to join one or more work pieces. This adapter 620 may consist of a blank having generally cylindrical forward and rear sections (662 & 624). The forward section 622 may have a forward face 626 shaped to abut the rivet head of the bolt rivet assembly (not shown). This forward section 622 may also have tapered front and back outer surfaces (628 & 630) to provide a more comfortable grip for the user. The rear section 624 may have a threaded outer circumference 632 to allow attachment of a hand or power tool (not shown).

Figure 47:
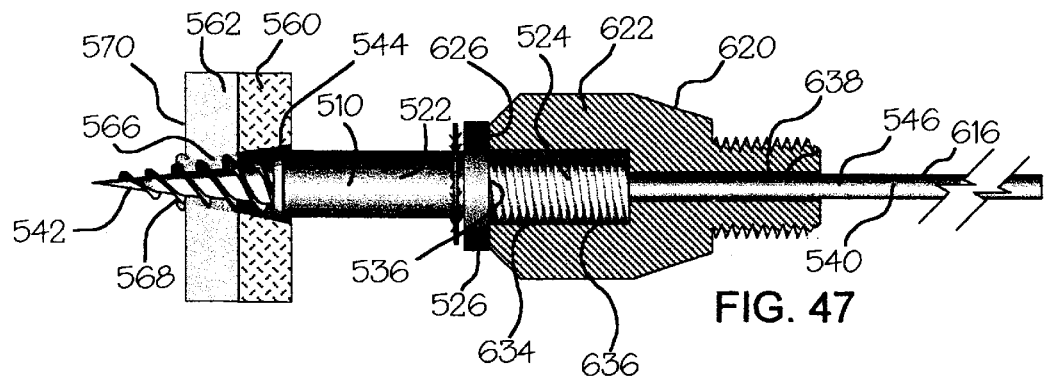
FIG. 47 is a partial cross-sectional side elevational view depicting a bolt rivet assembly inserted in the adapter shown in FIG. 46 prior to application of the rivet.
Figure 48:
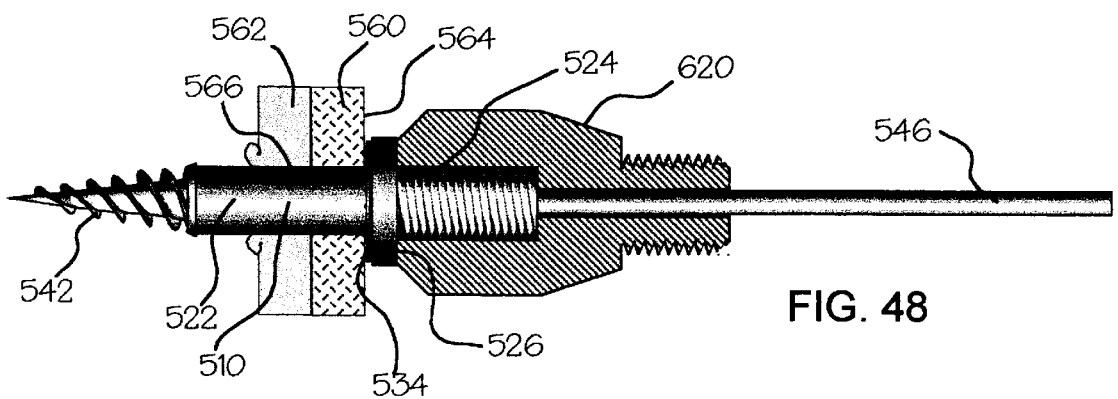
FIG. 48 is a partial cross-sectional side elevational view depicting a bolt rivet assembly inserted in the adapter shown in FIG. 46 prior to retraction of the mandrel.
Figure 49:
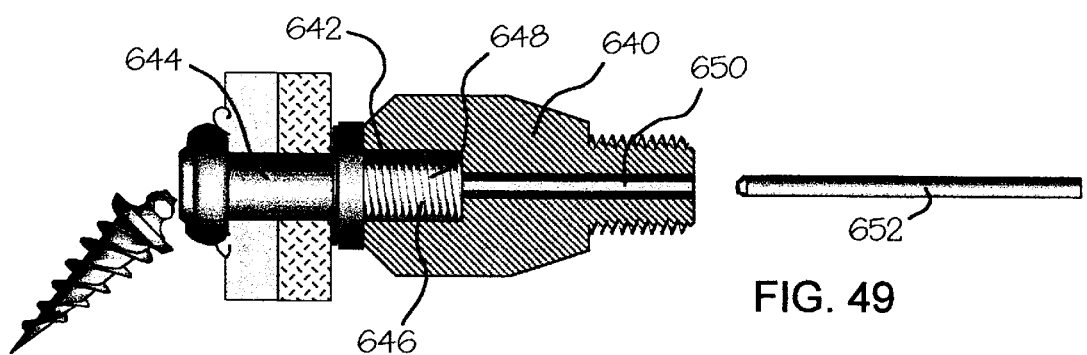
FIG. 49 is a partial cross-sectional elevational view of a bolt rivet assembly inserted in alternative embodiment of the adaptor depicted after separation of the mandrel shank and detachment of the screw tip.

FIGS. 47 through 49 illustrate the process for applying the bolt rivet assembly shown in FIG. 46 to join two work pieces. FIG. 47 is a partial cross-sectional side elevational view depicting a bolt rivet assembly inserted in the adapter shown in FIG. 46 prior to application of the rivet. Preferably, the adapter 620 has a cylindrical aperture 634 shaped to removably accept the threaded bolt head 524 and mandrel shank 546 of the bolt rivet assembly 510. This aperture 634 may extend longitudinally through the center of the adapter 620 and may consist of a forward cavity 636 having a diameter and length slightly greater than the diameter and length of the threaded bolt head 524 and a rear cavity 638 having a diameter slightly greater than the outer diameter of the mandrel shank 546. The threaded bolt head 524 and mandrel shank 546 of the bolt rivet assembly 510 may be inserted into the adapter 620 so that the forward face 626 of the forward section 622 of the adapter abuts the outer face 536 of the rivet head 526. By using a power or hand tool (not shown), rotary motion may be applied to the mandrel 540 causing the self-tapping screw tip 542 to tap a hole or aperture 566 in adjacent work pieces (550 & 562). As the self-tapping screw tip 542 punctures and spreads the work piece materials, material 568 on the inner surface 570 of the innermost work piece 562 is separated and folded longitudinally. This folding increases the strength of the attachment compared to a drilled hole. Preferably, the outer diameter of the shoulder section 544 of the mandrel 540 is slightly larger than outer diameter of rivet sleeve 522 allowing the sleeve to pass through the hole or aperture formed.

FIG. 48 is a partial cross-sectional elevational view depicting a bolt rivet assembly inserted in the adapter shown in FIG. 46 prior to retraction of the mandrel. The sleeve 522 of the rivet assembly 510 may be inserted into the aperture 566 created in the work pieces (560 & 562) by the screw tip 542 such that the rivet assembly and adapter 620 are positioned perpendicular to the outer surface 564 of the outermost work piece 560. Preferably, the rivet head 526 traps the locking washer 534 against the outer surface 564 of the outermost work piece 560. The rear portion of the mandrel shank 546 may be grasped by a hand or power tool (not shown) and axially retracted. Retraction of the shank 546 sets the rivet by deforming the tubular sleeve 522 of the rivet body 520. Preferably, the adapter 620 prevents the rivet body's threaded bolt head 524 from being deformed or damaged during this part of the application process. The adapter 620 may also assist the user in holding the rivet head 526 flush to the outer surface 564 of the outermost work piece 560.

FIG. 49 is a partial cross-sectional elevational view of a bolt rivet assembly having a shortened threaded bolt head inserted in an adaptor. FIG. 49 depicts the rivet assembly and adapter after separation of the mandrel shank. This adapter 640 may have an aperture 642 shaped to fit a bolt rivet assembly 644 having a shortened threaded bolt head 646. Preferably, the depths and diameters of the forward and rear cavities (648 & 650) of the aperture 642 may be sized to correspond the configuration of any bolt rivet assembly used. FIG. 49 depicts an adapter and rivet assembly after separation of the mandrel shank 652.

Figure 50:
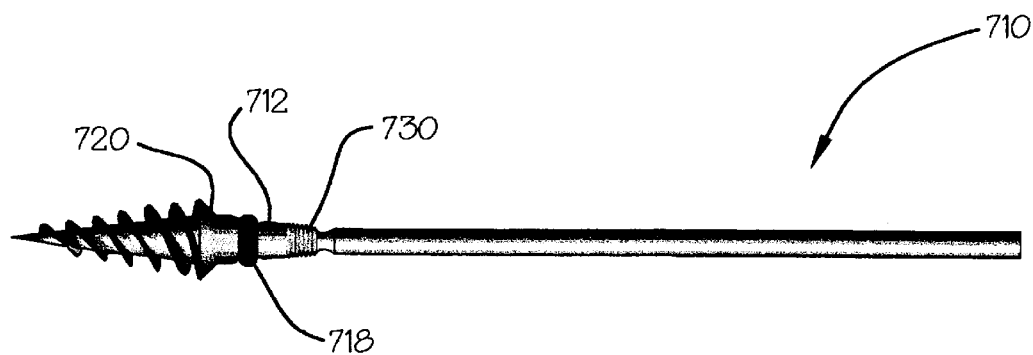
FIG. 50 is a side elevational view depicting an embodiment of the mandrel modified to enable the rivet assembly to be liquid and gas impervious.
Figure 51:
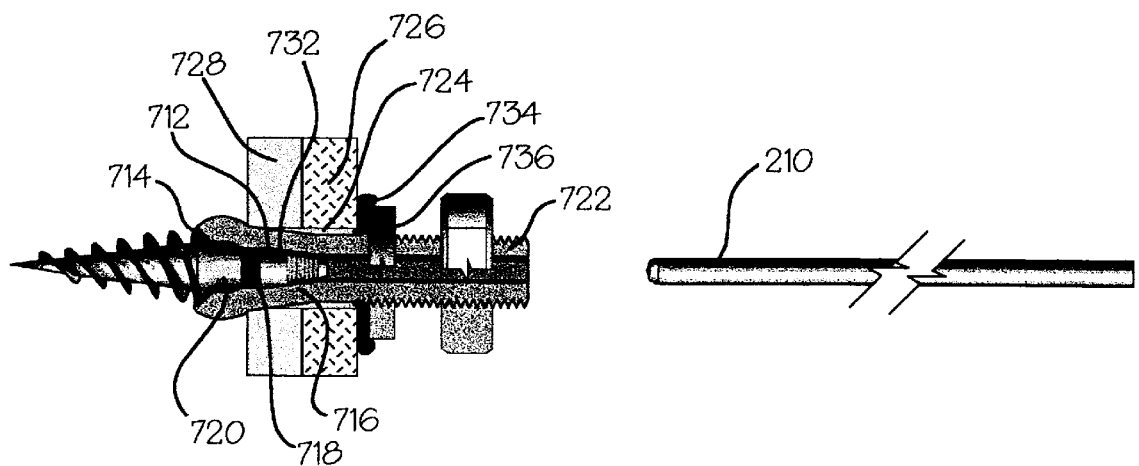
FIG. 51 is a partial cross-sectional side elevational view depicting a bolt rivet assembly employing the mandrel shown in FIG. 51.

FIGS. 50 and 51 depict an embodiment of a mandrel 710 modified to enable the rivet assembly to be environmentally sealed so as to be impervious to liquids and gases. An enlarged shank portion 712 may have an elongated conical shape to seal the aperture 714 of the tubular sleeve 716. A grommet or gasket 718 made of rubber, vinyl, plastic or the like may be added between the shoulder section 720 and this portion 712 to ensure a proper seal. Additionally, as the enlarged shank portion 712 is pulled into the sleeve 716 of the rivet body 722, its conical shape may radially expand the rivet body sleeve against the aperture 724 in the work pieces (726 & 728) forming a liquid and gas tight seal. The enlarged shank portion 712 may also have a plurality of ridges 730 to secure the forward shank 732 in the sleeve 716 preventing it from backing out. Additionally, a washer or gasket 734 made of rubber, vinyl, plastic, or the like may be disposed between the outer work piece 726 and the head 736 of the rivet body 722 to provide additional sealing capability. While these sealing features are illustrated in combination with a bolt rivet assembly according to the present invention, it should be obvious to one skilled in the art that they may be applied to other blind setting rivet assemblies as well.

In view of the above detailed descriptions of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A blind setting bolt rivet assembly, comprising:

a hollow rivet body having upper and lower ends and an enlarged flattened head, said lower end comprising a hollow tubular sleeve having an inner diameter, and said upper end comprising a hollow cylindrical threaded bolt head onto which a nut may be removably affixed to secure one or more work pieces or components wherein said enlarged flattened head engages the surface of the workpiece to prevent rotation of said bolt rivet assembly when the nut is tightened onto and loosened from said bolt head; and a mandrel disposed longitudinally within said rivet body comprising a shoulder section having an outer diameter greater than the inner diameter of said sleeve so that said shoulder section radially compresses and spreads the lower end of said sleeve as said mandrel is retracted rearward relative to said rivet body, and a shank having an area of reduced diameter spaced rearward from said shoulder section and sized to allow said shoulder section of said mandrel to be detached from the shank upon application of a predetermined tensile force to the shank.

2. The rivet assembly according to claim 1 further comprising a locking washer trapped between the enlarged flattened head and the upper surface of a workpiece to prevent rotation of the rivet body when the nut is tightened onto and loosened from said bolt head.

3. The rivet assembly according to claim 1 wherein the sleeve of the rivet body has a plurality of longitudinal apertures disposed therein so as to reduce the axial force required to deform said sleeve.

4. The rivet assembly according to claim 1 wherein said enlarged flattened head is threaded onto said threaded bolt head.

5. The rivet assembly according to claim 1 wherein said enlarged flattened head comprises a concave inner face which is flattened during application of the bolt rivet assembly thereby applying a force against the workpiece to prevent rotation of the bolt rivet assembly when the nut is tightened onto and loosened from said bolt head.

6. The rivet assembly according to claim 1 wherein said enlarged flattened head further comprises a serrated inner surface to prevent rotation of said rivet body when the nut is tightened onto and loosened from said bolt head.

7. The rivet assembly according to claim 1 wherein said enlarged flattened head further comprises a serrated outer surface.

8. The rivet assembly according to claim 1 wherein said mandrel further comprises an elongated conical portion disposed between said shoulder section and said area of reduced diameter and a grommet encircling said mandrel between said shoulder section and said conical portion; said conical portion and grommet providing a liquid and gas impermeable seal between said sleeve and said mandrel.

9. The rivet assembly according to claim 8 wherein said elongated conical portion comprises one or more ridges to retain said shoulder section, grommet, and conical portion within said sleeve.

10. The rivet assembly according to claim 1 wherein said enlarged flattened head is formed as part of said rivet body and separates said upper and lower ends.

11. The rivet assembly according to claim 1 wherein the diameter of said enlarged flattened head is larger than the diameter of the threaded bolt head.

12. A blind setting bolt rivet assembly, comprising:

(a) a hollow rivet body having upper and lower ends separated by an enlarged flattened head adapted to abut the surface of a work piece, said enlarged flattened head having oppositely disposed inner and outer surfaces, wherein at least one of said inner and outer surfaces are serrated, said lower end comprising a hollow tubular sleeve having an inner diameter, and said upper end comprising a hollow cylindrical threaded bolt head onto which a nut may be removably affixed to secure one or more work pieces or components;

(b) a mandrel disposed longitudinally within said rivet body comprising a shoulder section having an outer diameter greater than the inner diameter of said sleeve so that said shoulder section radially compresses and spreads the lower end of said sleeve as said mandrel is retracted rearward relative to said rivet body, and a shank having an area of reduced diameter spaced rearward from said shoulder section and sized to allow said shoulder section of said mandrel to be detached from the shank upon application of predetermined tensile force applied to the shank; and (c) a locking washer to prevent rotation of the rivet body, said washer encircling said lower sleeve.

13. A blind setting bolt rivet assembly comprising:

(a) a hollow rivet body having upper and lower ends separated by an enlarged flattened head adapted to abut the surface of a work piece, said lower end comprising a hollow tubular sleeve having an inner diameter, and said upper end comprising a hollow cylindrical threaded bolt head onto which a nut may be removably affixed to secure one or more work pieces or components;

(b) a mandrel disposed longitudinally within said rivet body comprising a shoulder section having an outer diameter greater than the inner diameter of said sleeve so that said shoulder section radially compresses and spreads the lower end of said sleeve as said mandrel is retracted rearward relative to said rivet body, and a shank having an area of reduced diameter spaced rearward from said shoulder section and sized to allow said shoulder section of said mandrel to be detached from the shank upon application of predetermined tensile force applied to the shank; and (c) a locking washer to prevent rotation of the rivet body, said washer encircling said lower sleeve;

wherein said mandrel further comprises an elongated conical portion disposed between said shoulder section and said area of reduced diameter and a grommet encircling said mandrel between said shoulder section and said conical portion; said grommet providing a liquid and gas impermeable seal between said sleeve and said mandrel.

14. The rivet assembly according to claim 13 wherein said elongated conical portion comprises a ridge to retain said shoulder section, grommet, and conical portion within said sleeve.

15. A self-tapping, blind setting rivet assembly comprising:

(a) a hollow rivet body having a tubular sleeve and an enlarged flattened head adapted to abut the surface of a work piece; and (b) a mandrel disposed longitudinally within said rivet body comprising a grooved screw tip having a diameter at least equal to the outer diameter of said sleeve so that said sleeve may pass through an aperture formed by the grooved screw tip in said one or more work pieces, a shoulder section adjacent to the grooved screw tip having an outer diameter greater than the inner diameter of said sleeve so that the shoulder section radially compresses and spreads the lower end of said sleeve as said mandrel is retracted rearward relative to said rivet body, and a shank having an area of reduced diameter spaced rearward from the shoulder section and sized to allow the grooved screw tip and shoulder section of said mandrel to be detached from the shank upon application of predetermined tensile force applied to the shank.

16. A self-tapping, blind setting bolt rivet assembly comprising:

(a) a hollow rivet body having upper and lower ends separated by an enlarged flattened head adapted to abut the surface of a work piece, said lower end comprising a hollow tubular sleeve, and said upper end comprising a hollow threaded bolt head onto which a nut may be removably affixed to secure one or more work pieces or components; and (b) a mandrel disposed longitudinally within said rivet body comprising a grooved screw tip having a diameter at least equal to the outer diameter of said sleeve so that said sleeve may pass through an aperture formed by the grooved screw tip in said one or more work pieces, a shoulder section adjacent to the grooved screw tip having an outer diameter greater than the inner diameter of said sleeve so that the shoulder section radially compresses and spreads the lower end of said sleeve as said mandrel is retracted rearward relative to said rivet body, said shoulder section having a tapered upper face, and an area of enlarged diameter spaced between the shoulder section and the area of reduced diameter of the shank so that said shoulder section and said area of enlarged diameter act together to retain the grooved screw tip and shoulder section within the sleeve due to interference with the inner diameter of the said sleeve caused by deformation of the sleeve during application, and a shank having an area of reduced diameter spaced rearward from the shoulder section and sized to allow the grooved screw tip and shoulder section of said mandrel to be detached from the shank upon application of predetermined tensile force applied to the shank.

17. A process for applying a blind setting bolt rivet assembly, comprising the steps of:

(a) drilling an aperture in a work piece, said aperture having a diameter slightly larger than the outer diameter of the sleeve of the body of the bolt rivet assembly;

(b) inserting the threaded bolt head and mandrel shank of the bolt rivet assembly in an adapter consisting of a blank having a generally cylindrical forward section having a forward face shaped to abut the rivet head, a generally cylindrical rear section having a threaded outer circumference to allow attachment of a hand or power tool, and a cylindrical aperture shaped to removably accept the threaded bolt head and mandrel shank of said bolt rivet assembly extending longitudinally through the center of said forward and rear sections, said aperture consisting of a forward cavity having a diameter and length slightly greater than the diameter and length of said threaded bolt head and a rear cavity having a diameter slightly greater than the outer diameter of said mandrel shank, said rear cavity extending from the forward cavity through the rear section of the blank;

(c) inserting the sleeve of the bolt rivet assembly through the aperture drilled in the work piece so that the rivet head is flush to the work piece;

(d) holding the adapter firmly against the rivet head and work piece; and (e) axially retracting the mandrel shank until said shank separates.

18. A process for applying a blind setting bolt rivet assembly, comprising the steps of:

(a) inserting a threaded bolt head and mandrel shank of the bolt rivet assembly in an adapter consisting of a blank including a generally cylindrical forward section having a forward face shaped to abut the rivet head, a generally cylindrical rear section having a threaded outer circumference to allow attachment of a hand or power tool, and a cylindrical aperture shaped to removably accept the threaded bolt head and mandrel shank of said bolt rivet assembly extending longitudinally through the center of said forward and rear sections, said aperture consisting of a forward cavity having a diameter and length slightly greater than the diameter and length of said threaded bolt head and a rear cavity having a diameter slightly greater than the outer diameter of said mandrel shank, said rear cavity extending from the forward cavity through the rear section of the blank;

(b) inserting a sleeve of the bolt rivet assembly through an aperture drilled in the work piece so that the rivet head is flush to the work piece;

(c) holding the adapter firmly against the rivet head and work piece; and (d) axially retracting the mandrel shank until said shank separates.

* * * * *